United States Patent
Jung et al.

(10) Patent No.: US 10,134,358 B2
(45) Date of Patent: Nov. 20, 2018

(54) HEAD MOUNTED DISPLAY DEVICE AND METHOD FOR CONTROLLING THE SAME

(71) Applicant: LG ELECTRONICS INC., Seoul (KR)

(72) Inventors: Heonjae Jung, Seoul (KR); Yunmi Kwon, Seoul (KR); Jihee Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 71 days.

(21) Appl. No.: 15/355,774

(22) Filed: Nov. 18, 2016

(65) Prior Publication Data

US 2017/0337897 A1    Nov. 23, 2017

(30) Foreign Application Priority Data

May 17, 2016    (KR) .................. 10-2016-0060316

(51) Int. Cl.
| | | |
|---|---|---|
| *G09G 5/00* | (2006.01) | |
| *G06F 3/01* | (2006.01) | |
| *G06F 3/0484* | (2013.01) | |
| *G06F 3/0488* | (2013.01) | |
| *G06F 3/03* | (2006.01) | |

(Continued)

(52) U.S. Cl.
CPC ........... *G09G 5/006* (2013.01); *G02B 27/017* (2013.01); *G06F 3/011* (2013.01); *G06F 3/012* (2013.01); *G06F 3/013* (2013.01); *G06F 3/0304* (2013.01); *G06F 3/0346* (2013.01); *G06F 3/03547* (2013.01); *G06F 3/04845* (2013.01); *G06F 3/04883* (2013.01); *G02B 2027/014* (2013.01); *G02B 2027/0187* (2013.01);

(Continued)

(58) Field of Classification Search
CPC ......... G02B 27/017; G02B 2027/0178; G02B 27/0172; G02B 2027/014; G06F 3/011; G06T 19/006
USPC .................. 345/7, 8, 633; 359/630
See application file for complete search history.

(56) References Cited

U.S. PATENT DOCUMENTS 8,643,951 B1    2/2014 Wheeler et al.
8,872,766 B2 * 10/2014 Moore ................. G02B 27/01
345/157

(Continued)

FOREIGN PATENT DOCUMENTS

WO    WO 2015/043505 A1    4/2015

OTHER PUBLICATIONS

Android Headlines, "HTC Vive Pair With Your Smartphone," XP054977445, retrieved from https://www.youtube.com/watch?v=M1FN4h7Xmd4, Apr. 22, 2016 (retrieved from the aforementioned URL on Jun. 16, 2017), times 2:23-3:10, 1 page.

(Continued)

*Primary Examiner* — Koosha Sharifi-Tafreshi
(74) *Attorney, Agent, or Firm* — Birch, Stewart, Kolasch & Birch, LLP

(57) ABSTRACT

A head mounted display (HMD) device including a communication processor configured to communicate with a mobile terminal; a display configured to display a content received from the mobile terminal; and a controller configured to in response to an event generated on the mobile terminal, selectively display an object on the display corresponding to the event generated on the mobile terminal, based on a type of the displayed content.

19 Claims, 26 Drawing Sheets

(51) Int. Cl.
*G06F 3/0346* (2013.01)
*G06F 3/0354* (2013.01)
*G02B 27/01* (2006.01)
*H04M 1/725* (2006.01)

(52) U.S. Cl.
CPC . *G06F 2203/0383* (2013.01); *G09G 2370/16* (2013.01); *H04M 1/72519* (2013.01)

(56) References Cited

U.S. PATENT DOCUMENTS

| | | | |
|---|---|---|---|
| 2007/0197195 A1 | 8/2007 | Sugiyama et al. | |
| 2012/0105473 A1* | 5/2012 | Bar-Zeev | G02B 27/017 345/633 |
| 2013/0326364 A1 | 12/2013 | Latta et al. | |
| 2013/0346922 A1* | 12/2013 | Shiplacoff | G06F 3/04842 715/835 |
| 2015/0138081 A1 | 5/2015 | Iwatsu et al. | |
| 2015/0169096 A1* | 6/2015 | Nishizawa | G02B 27/0172 345/173 |
| 2015/0382321 A1 | 12/2015 | Ryu et al. | |
| 2016/0018985 A1* | 1/2016 | Bennet | G06F 3/04886 345/175 |
| 2016/0034042 A1* | 2/2016 | Joo | G02B 27/0172 345/633 |
| 2016/0093105 A1* | 3/2016 | Rimon | G06T 19/006 345/633 |
| 2017/0322623 A1* | 11/2017 | McKenzie | G06F 3/013 |

OTHER PUBLICATIONS

Budhiraja et al., "Using a HHD with a HMD for mobile AR interaction," XP055382389, 2013 IEEE International Symposium on Mixed and Augmented Reality (ISMAR), Oct. 1-4, 2013, 6 pages.

Partial European Search Report dated Jun. 29, 2017, for corresponding European Application No. 17150493.9.

* cited by examiner

HEAD MOUNTED DISPLAY DEVICE AND METHOD FOR CONTROLLING THE SAME

CROSS-REFERENCE TO RELATED APPLICATION

Pursuant to 35 U.S.C. § 119(a), this application claims the benefit of an earlier filing date of and the right of priority to Korean Application No. 10-2016-0060316, filed on May 17, 2016, the contents of which are incorporated by reference herein in their entirety.

BACKGROUND OF THE INVENTION

1. Field of the Invention

This specification relates to a head mounted display (HMD) device which can execute communication with a mobile terminal, and a method for controlling the same.

2. Background of the Invention

A head mounted display (HMD) device is a device mounted to a user's head and that displays an image in front of the user's eyes. Such an HMD device allows a user to enjoy an image content larger than that on TV or a screen, or allows the user to enjoy a virtual space experience by displaying a virtual space screen.

Mobile terminals (portable terminals) have become increasingly more functional. Examples of such functions may include data and voice communications, capturing images and video through a camera, recording audio, playing music files through a speaker system, and displaying images and video on a display unit. Some mobile terminals additionally provide functions such as playing an electronic game, or executing a function of multimedia players. Especially, recent mobile terminals may receive multicast signal for providing visual content such as broadcasts, videos, or television programs.

As it becomes multifunctional, a mobile terminal can be allowed to capture still images or moving images, play music or video files, play games, receive broadcast and the like, so as to be implemented as an integrated multimedia player. Recently, the mobile terminal is being developed to have more various functions. Especially, a method of interworking such various functions of the mobile terminal with an HMD is being actively researched.

However, in case of interworking the mobile terminal with an HMD, a push notification generated from the mobile terminal may be displayed on the HMD as it is. This may cause a characteristic of the HMD not to be reflected. That is, this may disturb a user's viewing a content on the HMD.

SUMMARY OF THE INVENTION

Therefore, an aspect of the detailed description is to provide a head mounted display (HMD) device capable of displaying an event occurrence limitedly thereon when interworked with a mobile terminal, and a method for controlling the same.

Another aspect of the detailed description is to provide a head mounted display (HMD) device capable of rapidly checking an event even when an event notification is limitedly displayed thereon, and capable of immediately deleting the event notification in order to prevent lowering of a user's sense of immersion to a content, and a method for controlling the same.

To achieve these and other advantages and in accordance with the purpose of this specification, as embodied and broadly described herein, there is provided a head mounted display device, including: a communication unit configured to execute communication with a mobile terminal; a display unit configured to display a content received from the mobile terminal; and a controller configured to determine whether to notify one or more events generated from the mobile terminal based on a type of the displayed content, and configured to display one or more objects indicating occurrence of the one or more events on the content, based on the determination.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart glasses), head mounted displays (HMDs), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and a digital signage.

Figure 1:
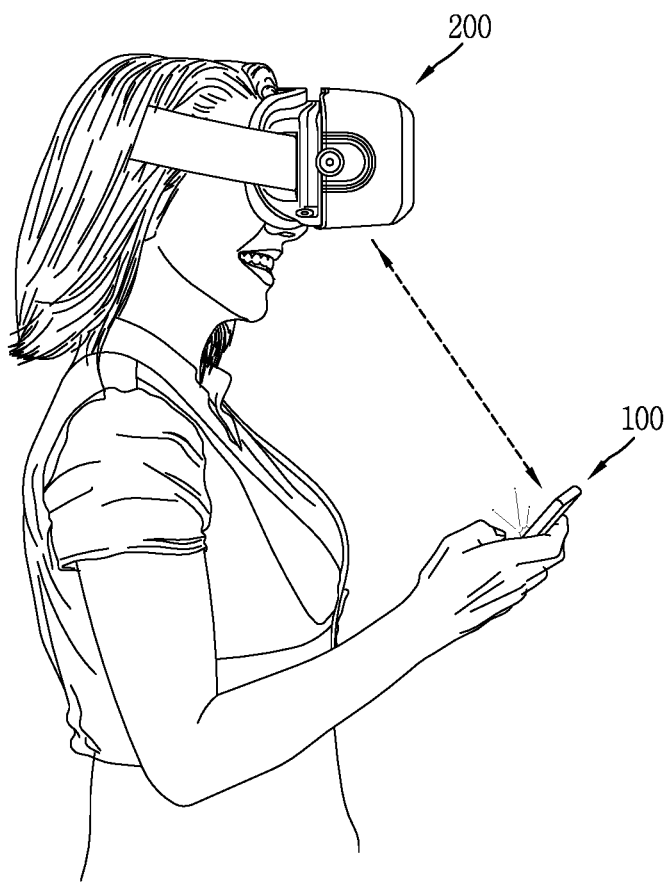
FIG. 1 is a view illustrating that a head mounted display (HMD) device is wirelessly communicating with a mobile terminal according to an embodiment of the present invention.
Figure 2:
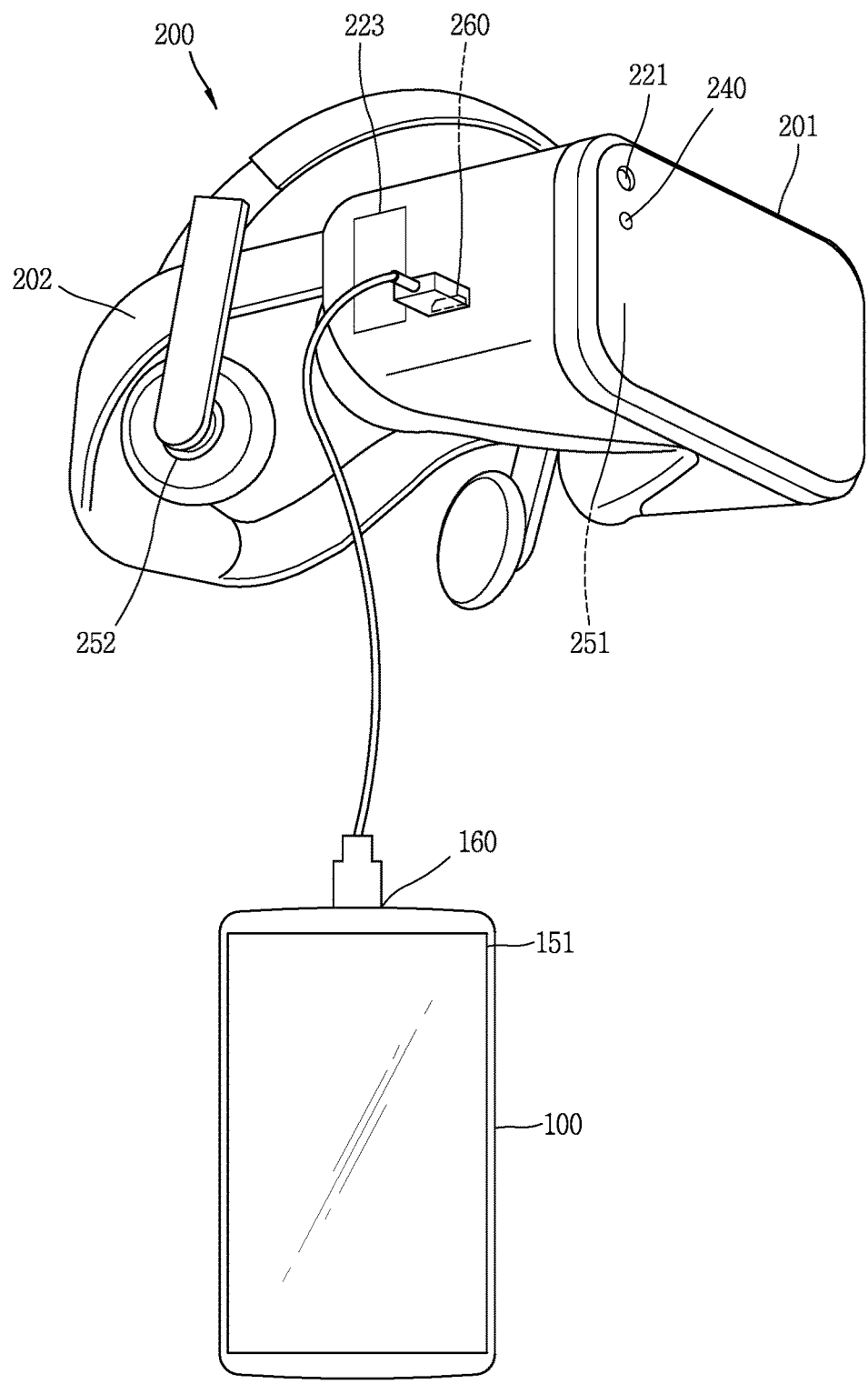
FIG. 2 is a view illustrating that a head mounted display (HMD) is connected to a mobile terminal for wired communication, according to an embodiment of the present invention.

FIG. 1 is a view illustrating that a head mounted display (HMD) device is wirelessly communicating with a mobile terminal according to an embodiment of the present invention, and FIG. 2 is a view illustrating that the head mounted display (HMD) is connected to the mobile terminal for wired communication, according to an embodiment of the present invention.

Referring to FIG. 1, a tethering type HMD 200 is wirelessly connected to a mobile terminal 100. The HMD 200 can receive information input through the mobile terminal 100 or a sensing signal, or share various information, data, etc. stored in the mobile terminal 100.

A virtual space image displayed on a display unit of the HMD 200 can be an image stored in the HMD 200 or stored in the mobile terminal 100 which wirelessly communicates with the HMD 200. For instance, in case of a virtual space image stored in the HMD 200, the HMD 200 can execute an image processing and a rendering process to process the virtual space image, and may output video information generated after the image processing the rendering process to the display unit. Further, in case of a virtual space image stored in the mobile terminal 100, the mobile terminal 100 can execute an image processing and a rendering process, and may transmit video information generated after the image processing the rendering process to the HMD 200. Then, the HMD 200 can output the video information received from the mobile terminal 100.

Referring to FIG. 2, the HMD 200 can be provided with an interface unit 260. The interface unit 260 may be provided at a first frame 201 of a body of the HMD 200. In FIG. 2, the HMD 200 is connected to the mobile terminal 100 by wire through the interface unit 260.

The interface unit 260 of the HMD 200 serves as an interface with various types of external devices that are connected to the HMD 200 (e.g., the mobile terminal 100). For example, the interface unit 260 can receive data transmitted from an external device (the mobile terminal 100), receive power to transfer to elements and components within the HMD 200, or transmit internal data of the HMD 200 to such external device. The interface unit 260 may include wired or wireless headset ports, external power supply ports, wired or wireless data ports, memory card ports, ports for connecting a device having an identification module, audio input/output (I/O) ports, video I/O ports, earphone ports, or the like.

As shown in FIG. 2, the interface unit 260 of the HMD 200 and the interface unit 160 of the mobile terminal 100 can be connected to each other by a wired cable, for communication with each other. For instance, the interface unit 260 of the HMD 200 and the interface unit 160 of the mobile terminal 100 may be wired data ports. The interface unit 260 of the HMD 200 and the interface unit 160 of the mobile terminal 100 may also have the same type of ports or different types of ports.

The HMD 200 connected to the mobile terminal 100 by wire may be controlled by the controller 180 of the mobile terminal 100. In addition, a controller of the HMD 200 can control the HMD 200, based on data received from the mobile terminal 100 through a wired cable (e.g., a control command).

In the specification, for convenience, the HMD 200 is controlled by the controller 180 of the mobile terminal 100 which is connected to the HMD 200 by wire. However, the present invention is not limited to this, and the HMD 200 can be controlled by the controller thereof. Further, the mobile terminal 100 connected to the HMD 200 by wire or wirelessly for data transception (transmission and reception) may serve as a controller (a control device or a control means) for controlling the HMD 200.

Figure 3A:
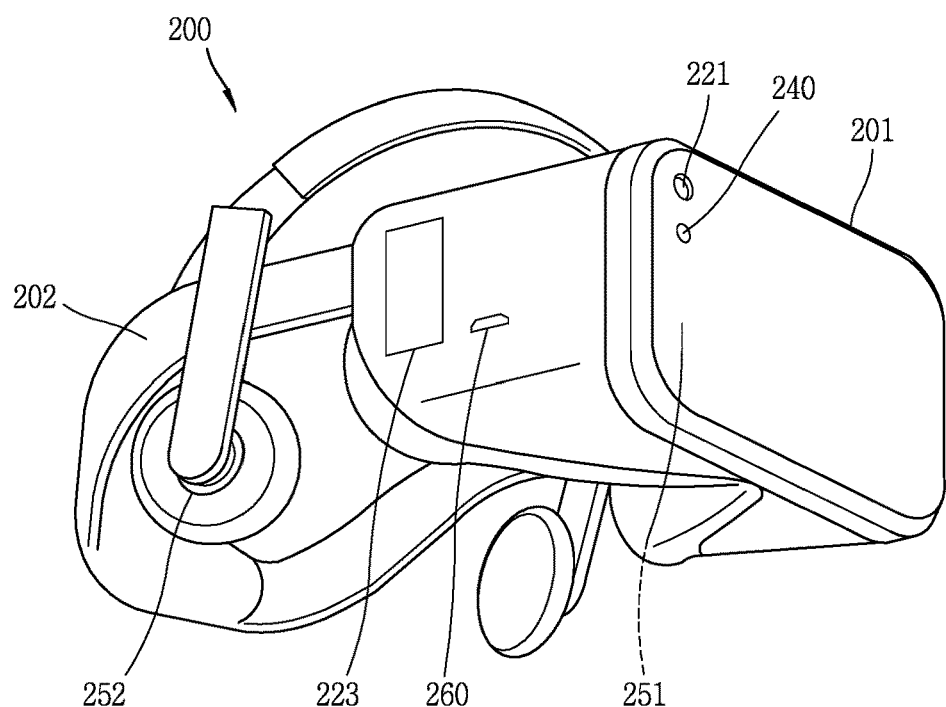
FIGS. 3A and 3B are conceptual views illustrating an HMD according to an embodiment of the present invention.
Figure 3B:
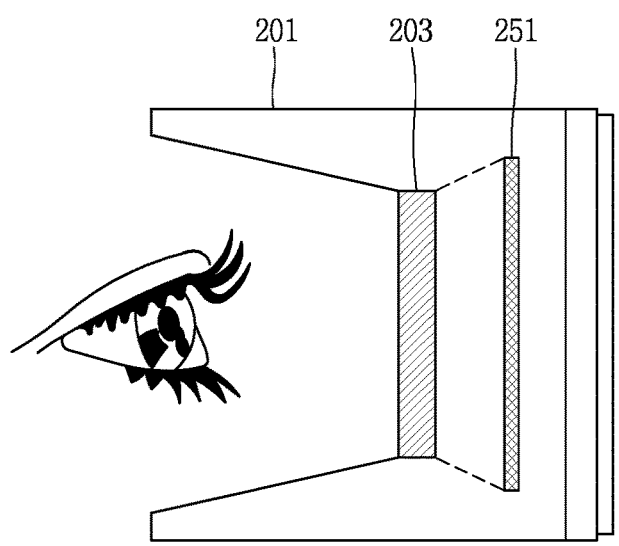

Next, FIGS. 3A and 3B are conceptual views illustrating the HMD according to an embodiment of the present invention. The HMD 200 of the present invention includes at least one of components to be explained below with reference to FIG. 4A.

For instance, the HMD 200 can include at least one a wireless communication unit, an input unit (e.g., a user input unit 223, a microphone, etc.), a sensing unit 240, an output unit (e.g., a display unit 251), an audio output unit 252, an interface unit 260, a memory, a controller, and a power supply unit. Implementing all of the illustrated components of FIG. 3A is not a requirement, and that greater or fewer components may alternatively be implemented.

Referring to FIG. 3A, the HMD 200 is formed to be wearable on a user's head (face), and includes a frame unit (a case, a housing, a cover, etc.). The frame unit may be formed of a flexible material for facilitation of wearing. In the drawing, the frame unit includes a first frame 201 and a second frame 202 which are formed of different materials.

Figure 4A:
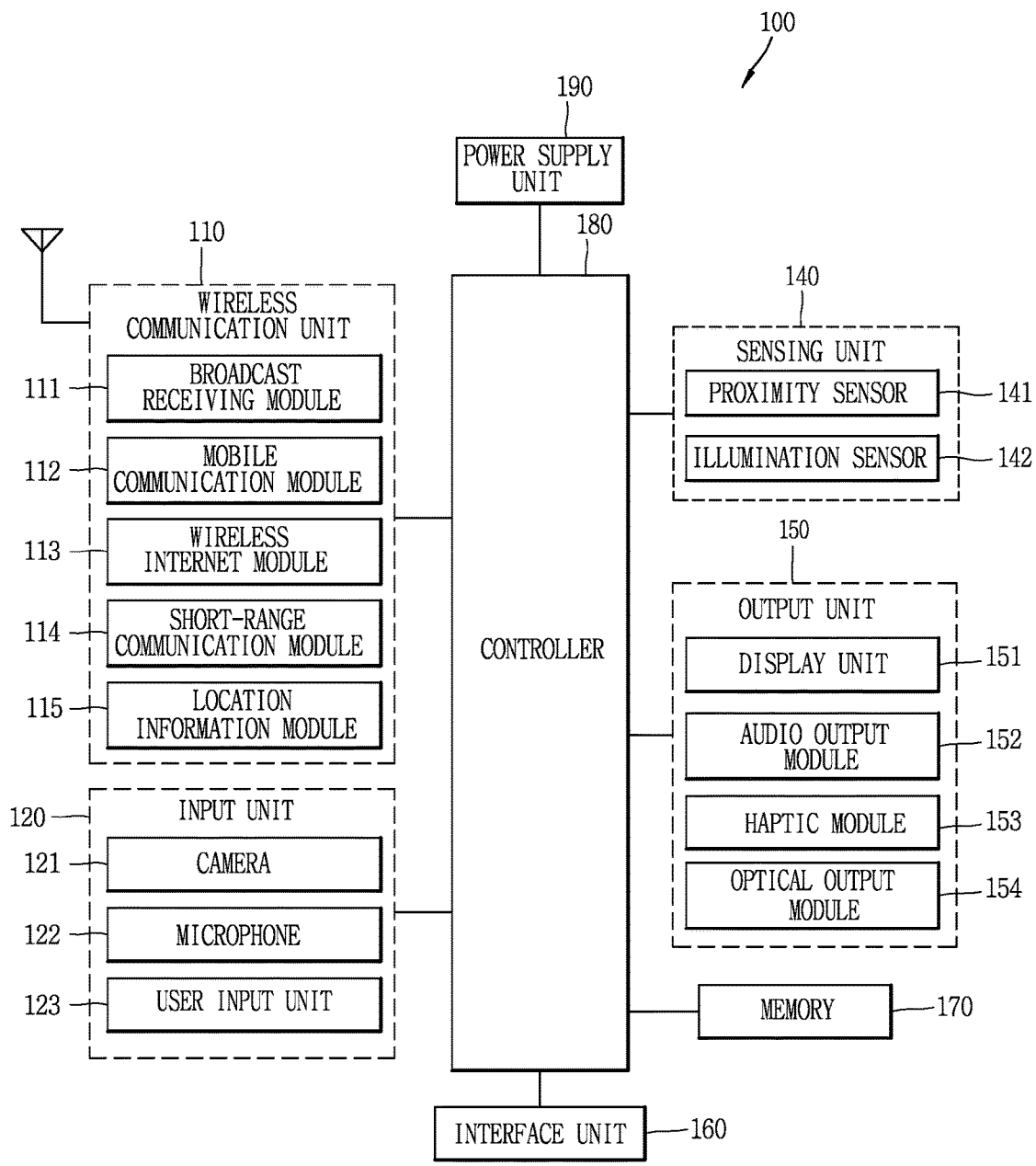
FIG. 4A is a block diagram illustrating explaining a mobile terminal according to an embodiment of the present invention.

For instance, the first frame 201 may provide a space where at least one of the components to be explained later with reference to FIG. 4A is arranged, and the second frame 202 may support the first frame 101 so as to be mountable to a user's head. The frame unit may be called a body (or an HMD body). The HMD body may be understood to indicate the HMD 200 regarded as at least one assembly. Hereinafter, the HMD body will be provided with the same reference numeral 200.

In an assumption that the frame unit including the first frame 201 and the second frame 202 as a single HMD body, the HMD body of the present invention may be formed in various manners. More specifically, the body may include a plurality of surfaces having a preset angle therebetween. The plurality of surfaces mean surfaces positioned outside the HMD body. From this perspective, the plurality of surfaces may mean surfaces (external surfaces, outer surfaces, etc.) of the HMD 200. Each of the plurality of surfaces may be formed to be flat or curved.

The body (frame unit) is supported on a head, and provides a space where various types of components are mounted. As shown, electronic components such as a camera 221, the display unit 251, the user input unit 223, the controller 280, the sensing unit 240, and the interface unit 260, may be mounted to the first frame 201.

Electronic components such as the audio output unit 252 may be mounted to the second frame 202. However, the present invention is not limited to this. That is, components to be explained later with reference to FIG. 4A, and components required in the HMD may be variously arranged at the first frame 201 and the second frame 202, according to a user's selection. That is, the HMD 200 of the present invention may have greater or fewer components than the aforementioned components. The controller of the HMD 200 is configured to control electronic components provided at the HMD 200. The controller may be understood as a component corresponding to the controller 180 to be explained with reference to FIG. 4A.

As shown in FIG. 3A, the camera 221 may be provided at the body 200. For instance, the camera 221 may be disposed on one surface (e.g., a front surface) of the HMD body 200. The camera 221 is disposed near at least one of a left eye and a right eye, and is formed to capture (receive or input) a front image. Since the camera 221 is arranged near the eye to capture a front image, the camera 221 may acquire a scene at which a user stares, as an image.

In the drawings, the camera 221 is provided in one, but the present invention is not limited to this. That is, the camera 221 may be provided in plurality, and may be configured to capture a stereoscopic image.

The HMD 200 can be provided with the sensing unit 240. The sensing unit 240 may include a proximity sensor and an illumination sensor. Further, the sensing unit 240 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 221), a microphone, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few.

For instance, the controller 280 can sense a motion of the HMD using a gyroscope sensor, a gravity sensor, a motion sensor, etc. included in the sensing unit 240. As another example, the controller 280 can sense an object approaching the HMD body, using a proximity sensor, an illumination sensor, a magnetic sensor, an infrared sensor, an ultrasonic sensor, an optical sensor, etc. included in the sensing unit 240.

The HMD 200 can be provided with the user input unit 223 manipulated to input a control command. The user input unit 223 may employ any tactile method that allows a user to perform manipulation such as touch and push. In the drawings, the user input unit 223 of a push type and a touch type is provided at the frame unit.

The HMD 200 can be further provided with a microphone for processing a received sound into electrical voice data, and the audio output unit 252 for outputting a sound. The audio output unit 252 may be configured to produce audio in a general audio output manner or an osteoconductive manner. When the audio output module 252 is implemented in the osteoconductive manner, the audio output module 252 may be closely adhered to a user's head when the user wears the HMD 200 and vibrate the user's skull to transfer sounds.

As shown in FIG. 3B, the display unit 251 is mounted to the frame unit, and is configured to output screen information (e.g., still images, moving images, etc.) in front of a user's eyes. The display unit 251 may be disposed to correspond to at least one of a left eye and a right eye, such that screen information may be displayed in front of the eyes of a user who has worn the HMD 200. That is, the display unit 251 may be formed to cover at least one of the left eye and the right eye (or to face at least one of the left eye and the right eye).

For instance, the display unit 251 of the HMD may be disposed in the HMD body. More specifically, the display unit 251 may be disposed at a position facing a user's eyes when the user wears the HMD on the head. The HMD 200 can include a lens unit 203 such that a user can view all screen information output from the display unit formed in the HMD body. That is, the HMD 200 of the present invention may be formed such that all of screen information (or light) output from the display unit 251 may be transmitted to a user's eyeballs (or view) through the lens unit 203.

For instance, the lens unit 203 may be disposed to correspond to at least one of a user's two eyes (the left eye and the right eye). And the lens unit 203 may be disposed to be positioned between the user's eyeballs and the display unit 251 when the user wears the HMD on the head. Since a viewing angle is variable according to a distance between the user's eyeballs and the display unit, the lens unit 203 may be formed such that its position may be changed by the user's control. And the lens unit 203 may be formed as a concave lens, a convex lens, or a combination thereof.

The display unit 251 may project an image to a user's eyes using a prism. The prism may be formed of a transmissive material such that the user can see both the projected image and a general view at a front side (a viewing angle). An image output through the display unit 251 may be seen in an overlapped manner with a general view. The HMD 200 can provide an augmented reality (AR) which provides a single image by overlapping a real image or background with a virtual image using a characteristic of the display unit 251.

That is, the display unit 251 may be formed such that external light may not pass therethrough for implementation of a virtual reality (VR), or may be formed such that external light may pass therethrough for implementation of an augmented reality (AR). In addition, the display unit 251 which covers at least one of a left eye and a right eye may be detachably mounted to the frame unit.

The display unit 251 may be a display unit of an external mobile terminal. The HMD body 200 (frame unit) may be formed such that an external mobile terminal may be detachably mounted thereto, and may be electrically connected to the external mobile terminal. When the HMD body 200 is electrically connected to the external mobile terminal 200, the controller of the HMD may control the external mobile terminal.

If the external mobile terminal is mounted to the HMD body 200, the aforementioned camera 221, sensing unit 240, display unit 251, controller, etc. of the HMD 200 can be replaced by a camera, a sensing unit, a display unit, a controller, etc. of the external mobile terminal. In the present invention, it is assumed that an external mobile terminal is not mounted to the HMD body 200, but the HMD 200 itself is provided with the display unit 251, for a small weight.

Hereinafter, the components of the HMD body will be explained in more detail. The wireless communication unit may include one or more modules which enable wireless communication between the HMD 200 and a wireless communication system, between the HMD 200 and another HMD 200, between the HMD 200 and a mobile terminal (a fixed terminal), between the HMD 200 and a controller, between the HMD 200 and an external camera for wireless communication, or between the HMD 200 and an external server.

Further, the wireless communication unit may include one or more modules which connect the HMD 200 to one or more networks. The wireless communication unit may include at least one of a broadcasting receiving module, a mobile communication module, a wireless Internet module, a short-range communication module and a location information module. The wireless communication unit to be explained with reference to FIG. 4A will be applied to such modules in the same or similar manner.

However, the present invention is not limited to this. That is, the mobile terminal 100 and the HMD 200 according to an embodiment of the present invention can transceive (transmit and receive) data with each other through the interface unit 160 of the mobile terminal 100 and the interface unit 260 of the HMD 200, in a wired communication manner.

Figure 4B:
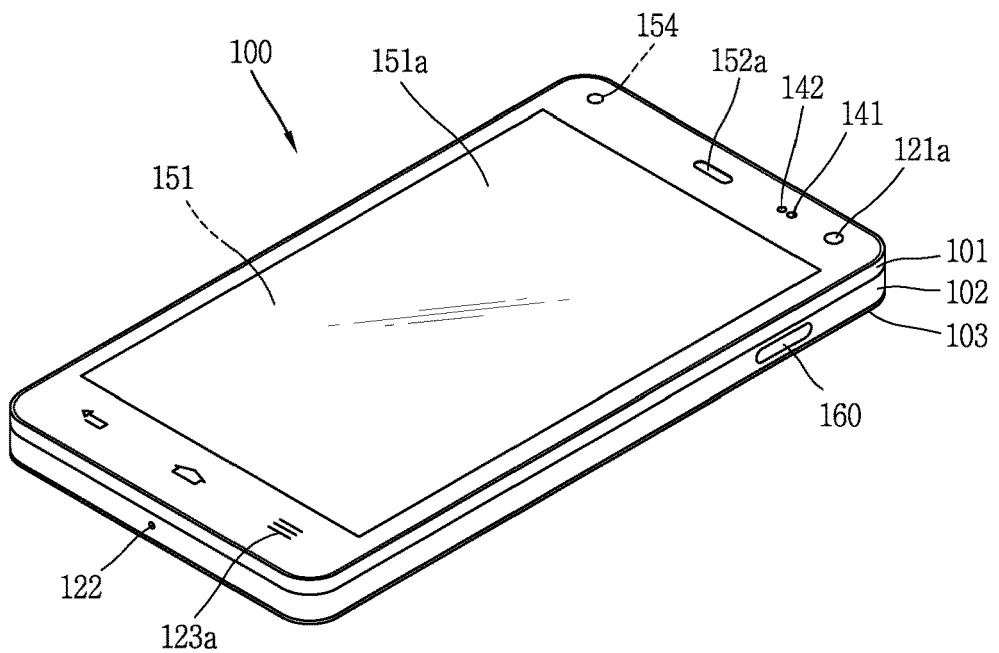
FIGS. 4B and 4C are conceptual views illustrating an example of a mobile terminal according to an embodiment of the present invention, which are viewed from different directions.
Figure 4C:
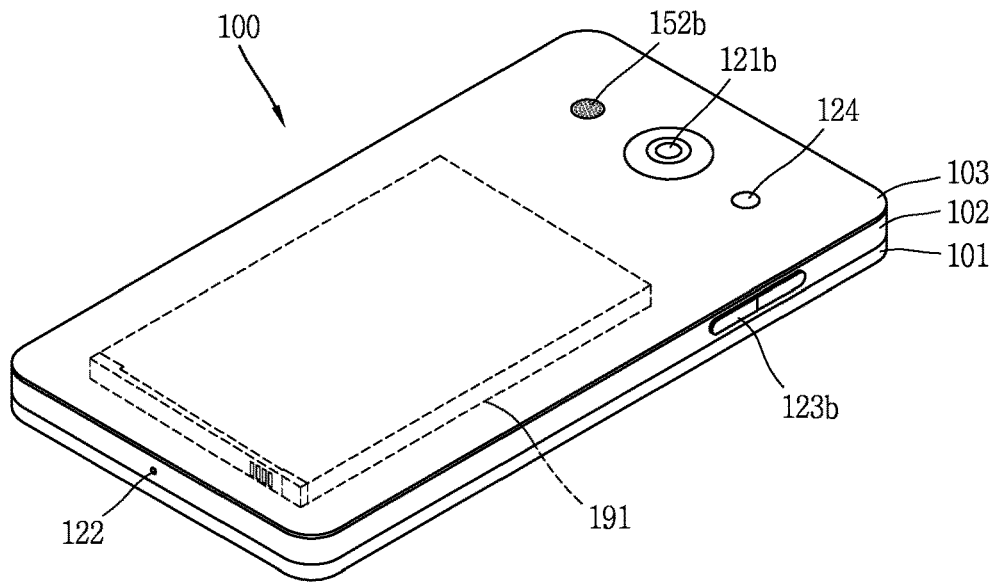

FIG. 4A is a block diagram illustrating explaining the mobile terminal 100 connected to the HMD 200 and FIGS. 4B and 4C are conceptual views illustrating an example of the mobile terminal 100 according to an embodiment of the present invention, which are viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components of FIG. 4A is not a requirement, and that greater or fewer components may alternatively be implemented.

Referring now to FIG. 4A, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115. The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 4A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 4A, or activating application programs stored in the memory 170. As one example, the controller 180 controls some or all of the components illustrated in FIGS. 4A-4C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body. The display unit 151 may have an inter-layered structure or an integrated structure with a touch sensor in order to facilitate a touch screen.

The touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor provided at the display unit 151 may be configured to sense taps in an activated state and a deactivated state, using different methods. The different methods may be associated with an activation period of the touch sensor. More specifically, the touch sensor may be activated with a different period according to an activated state or a deactivated state of the display unit 151. That is, the touch sensor may sense a tap applied thereon, with a different activation period, according to an activated state or a deactivated state of the display unit 151.

For instance, in a deactivated state of the display unit 151, the touch sensor may be activated with a preset period. In this instance, the preset period may be a time period more than 0. Further, in an activated state of the display unit 151, the touch sensor may be always operated in an activated state. In this instance, an activation period of the touch sensor may be a time period of 0 or very close to 0.

Whether the touch sensor is in an activated state or a deactivated state may be determined based on a power consumption amount of the touch sensor. For instance, if a power consumption amount of the touch sensor is equal to or less than a preset value based on '0', it may be determined that the touch sensor is in a deactivated state. Further, if a power consumption amount of the touch sensor exceeds the preset value based on '0', it may be determined that the touch sensor is in an activated state.

If the display unit 151 is in an activated state (hereinafter, will be referred to as an active mode), the touch sensor may wait for input of taps onto the display unit 151, while maintaining an activated state. Further, if the display unit 151 is in a deactivated state (hereinafter, will be referred to as a doze mode), the touch sensor may be activated at preset periods.

When the preset activation period of the touch sensor is shorter, a sensing speed with respect to taps applied onto the display unit 151 is higher. However, in this instance, a power consumption amount of the touch sensor may be increased. Further, when the preset activation period of the touch sensor is longer, a sensing speed with respect to taps applied onto the display unit 151 may be lower, while a power consumption amount of the touch sensor is decreased.

Thus, the preset period may be set so that a sensing speed with respect to taps applied onto the display unit 151 can be high enough not to be recognized by a user, and so that power consumption can be reduced. For instance, the preset period may be set so that the touch sensor in a deactivated state can be activated about 20 times (1 Hz) per second.

While the display unit 151 is in an activated state, the touch sensor may be also in an activated state. In an activated state, the touch sensor may have an activation period (T) of '0' or a value very close to '0'. Alternatively, in an activated state, the touch sensor may have an activation period (T) much shorter than that set in a deactivated state of the display unit 151, by several times. That is, the touch sensor may be activated with a different period, according to whether the display unit 151 is in an activated state or a deactivated state.

In a doze mode where the display unit 151 is in a deactivated state and the touch sensor is periodically activated, if a preset touch input (first and second touch inputs consecutively applied onto a predetermined region within a reference time, e.g., a 'KNOCK-KNOCK' touch input) is sensed by the touch sensor, the controller 180 can convert the doze mode into an activate mode where the display unit and the touch sensor are activated.

Moreover, the touch sensor may be driven at a different period according to a state of the display unit 151. For instance, the touch sensor may execute a doze mode when the display unit 151 is in a closed state, and execute an active mode when the display unit 151 is converted from a closed state to an open state.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

At least some of the components may operate in cooperation with one another in order to implement an operation, control or control method of the mobile terminal according to various exemplary embodiments to be described below. The operation, control or control method of the mobile terminal may be implemented on the mobile terminal by the execution of at least one application program stored in the memory 170.

The HMD 200 according to an embodiment of the present invention, which includes at least one of the aforementioned components, may selectively inform occurrence of an event while a content is being displayed, for enhancement of a user's sense of immersion. For this, the HMD 200 can be connected to the mobile terminal 100 so as to execute communication wirelessly or by wire. And the HMD 200 can display a content received from the mobile terminal 100 connected thereto, on the display unit 251.

Here, the content received from the mobile terminal 100 is not limited in type. For instance, the content may include a home screen output to the display unit 151 of the mobile terminal 100, or a specific application (i.e., all types of programs executable in the mobile terminal 100). Said all types of programs are related to a web browser, a video play, a schedule management, a call, a game, music, a document task, a message, finance, an e-book, traffic information, an application update, etc.

The content received from the mobile terminal 100 may be a VR content (or AR content displayed in a substantial environment) formed in all directions (e.g., 360°) based on a user who has worn the HMD 200. The VR content may mean a 3D image (a stereoscopic image) having undergone a rendering process such that a user who has worn the HMD 200 can feel as if he or she is in a specific space (or a virtual space).

If the content received from the mobile terminal 100 is VR content, the aforementioned programs related to a web browser, a video play, a schedule management, a call, a game, music, a document task, a message, a finance, an e-book, traffic information, an application update, etc. may be formed as 3D images or stereoscopic images.

While the content is being displayed on the display unit 251 of the HMD 200, if an event occurs from at least application installed to the mobile terminal 100 or the HMD 200, the controller 280 of the HMD 200 can differently determine whether to notify the event or not, based on a type of the displayed content. The determination as to whether to notify the event or not in a different manner means determination to notify part of events generated from the mobile terminal 100 and the HMD 200.

Alternatively, the determination as to whether to notify the event or not in a different manner, means notifying events generated from the mobile terminal 100 and the HMD 200 in a different manner, or notifying an event on one of the mobile terminal 100 and the HMD 200. Alternatively, the determination as to whether to notify the event or not in a different manner, means differently displaying images indicating occurrence of events on the HMD 200 and the mobile terminal 100. The event may be categorized into a set type event and an execution type event according to an occurrence type.

The set type event is an event which occurs when a setting of the mobile terminal 100 or the HMD 200 is changed. For instance, the set type event may occur when a setting is changed, the setting such as a Wi-Fi setting (on, off, a connection setting with a specific AP, etc.), a Bluetooth setting (on, off, a connection with a specific device, etc.), a data network setting (on or off), a sound setting (on, off, vibration, mute, etc.), a background image setting (or wallpaper), a volume control setting, a GPS setting (on, off), a hotspot setting, an application lock setting, a lock screen setting, a setting whether to receive a call or not, and a font size setting. Further, when other settings of the mobile terminal 100 or the HMD 200 are changed, the controller 180 or the controller 280 can determine that an event has occurred.

The execution type event is an event which occurs when a specific action is executed on the mobile terminal 100 or the HMD 200. For instance, the execution type event may occur when a message is sent, or when an application, a music play, a video play, a web browser, etc. are executed. Further, when other actions occur from the mobile terminal 100 or the HMD 200, the controller 180 or the controller 280 can determine that an event has occurred.

The controller 180 can selectively display, on the display unit 251, an object indicating occurrence of an event, based on a determination whether to inform an event notification. For instance, in case of a content having a higher sense of immersion (e.g., a game, a video, a movie, etc.), push notifications of some events may be restricted. While a game content is being executed, push notifications of events generated from contents which belong to the same category (e.g., a game), may be restricted. Such restricted notifications of the events may be provided at one time when a preset condition is satisfied. For instance, when the execution of the content is terminated, when the play of the content is temporarily stopped, or when the content has moved to an upper content, such restricted notifications of the events may be provided at one time or sequentially.

In case of displaying an event notification, the controller 280 can output objects indicating occurrence of events as different images, according to a type and an execution state of a content being displayed. Here, the different images may be images different from each other in a duration time, a highlighting effect, etc., as well as in a size, a shape, a color and a display position. For instance, if a content type requires a higher sense of immersion for a long time, an object may be displayed in a minimized size or in a similar color to a background color of the content, or may be displayed on an edge of the content, or an event notification may be displayed only for a short time, in order not to disturb a user's sense of immersion.

As aforementioned, in the present invention, while a content is being displayed on the HMD 200, an event notification may be selectively provided according to a type of the content, in order not to disturb a user's sense of immersion. Further, since an event notification may be differently provided according to a type and an execution state of a content, a user's sense of immersion may be enhanced and an event notification effect may be provided.

Figure 5:
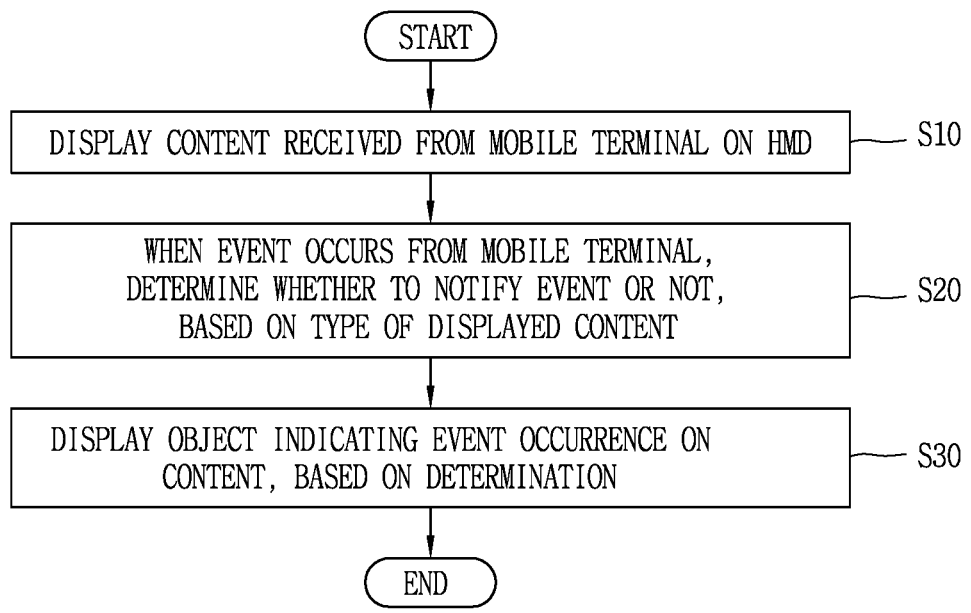
FIG. 5 is a flowchart illustrating an operation of an HMD according to an embodiment of the present invention.

FIG. 5 is a flowchart illustrating an operation of the HMD according to an embodiment of the present invention. Firstly, a content received from the mobile terminal 100 connected to the HMD 200 is displayed on the display unit 251 of the HMD 200 (S10).

Here, the content received from the mobile terminal 100 is not limited in type. As aforementioned, the content may be one of a web browser, a video play, a schedule management, a call, a game, music, a document task, a message, finance, an e-book and traffic information.

And the received content is a 2D image or a 3D image (hereinafter, will be referred to as a virtual space), and can be displayed on the display unit 251 of the HMD 200. Here, the virtual space may be a 3D image formed in all directions (e.g., 360°) based on a user who has worn the HMD 200. Such a virtual space may be a 3D image (a stereoscopic image) having undergone a rendering process such that a user who has worn the HMD 200 can feel as if he or she is in a specific space. In this instance, only one region of the virtual space is output to the display unit 251 of the HMD 200. Here, the one region may be one of a region output as a default, a region including a specific object, a specific region set by a user, and a region which was being output at an ending time point among the previously-output virtual space.

The output one region of the virtual space can also be changed based on a user's head gesture. For instance, if a user moves his or her head up and down or right and left, at least part of the one region of the virtual space may disappear, and another region corresponding to a moving direction of the user's head may be displayed on the display unit 251. With such a configuration, a user who has worn the HMD 200 can be provided with an interaction that the user feels as if he or she moves in the virtual space.

Then, the HMD 200 can differently determine whether to notify an event occurrence according to a type of the displayed content, in response to an event generated from at least one application installed to the mobile terminal 100 or the HMD 200 (S20). That is, the HMD 200 can determine whether to output an event notification or not, based on a content type.

For this, the controller 280 of the HMD 200 can firstly determine a type and an execution degree of the content, when an event occurs or when a signal corresponding to the event occurrence is received. Further, the controller 280 can provide a result of the determination to the controller 180 of the mobile terminal 100. In this instance, the controller 180 of the mobile terminal 100 can determine a type of an event notification in the mobile terminal 100, based on the received result of the determination.

Further, the controller 280 can determine whether to notify an event occurrence based on setting information stored in the memory of the HMD 200 or the memory 170 of the mobile terminal 100. For instance, if a push notification about a specific event or an event generated from a specific application is set in an always-on state and is stored in the memory of the HMD 200 or the memory 170 of the mobile terminal 100, the controller 280 can determine to provide an event notification regardless of a type of the displayed content. Then, the HMD 200 can display an object indicating an event occurrence on the displayed content (S30), based on the determination (S20).

The object may be the same image as a notification icon displayed in response to occurrence of an event from the mobile terminal, or may be a different image from the notification icon for minimization of a sense of immersion of a user who has worn the HMD 200. The controller 280 of the HMD 200 can determine an object image based on an execution degree of a content. The execution degree of the content may include at least one of an execution time, an execution frequency (number of times), an execution state, and an entry degree to a lower content of the content displayed on the HMD 200.

More specifically, for the same type of content, the controller 280 can predict a user's concentration degree according to an execution degree of the content displayed on the display unit 251, and then control an event notification type in correspondence to the predicted user's concentration degree. For instance, if it is determined that an execution time of a content has exceeded a reference time, or if it is determined that an entry degree to a lower content is more than a reference level (e.g., 3 levels), the controller 280 can determine that the user is concentrating on the content. As a result, the controller 280 can provide an event notification in a minimized form. In another embodiment, an event notification level can be changed in advance at a time point when an execution degree of the content displayed on the display unit 251 is changed.

Figure 6:
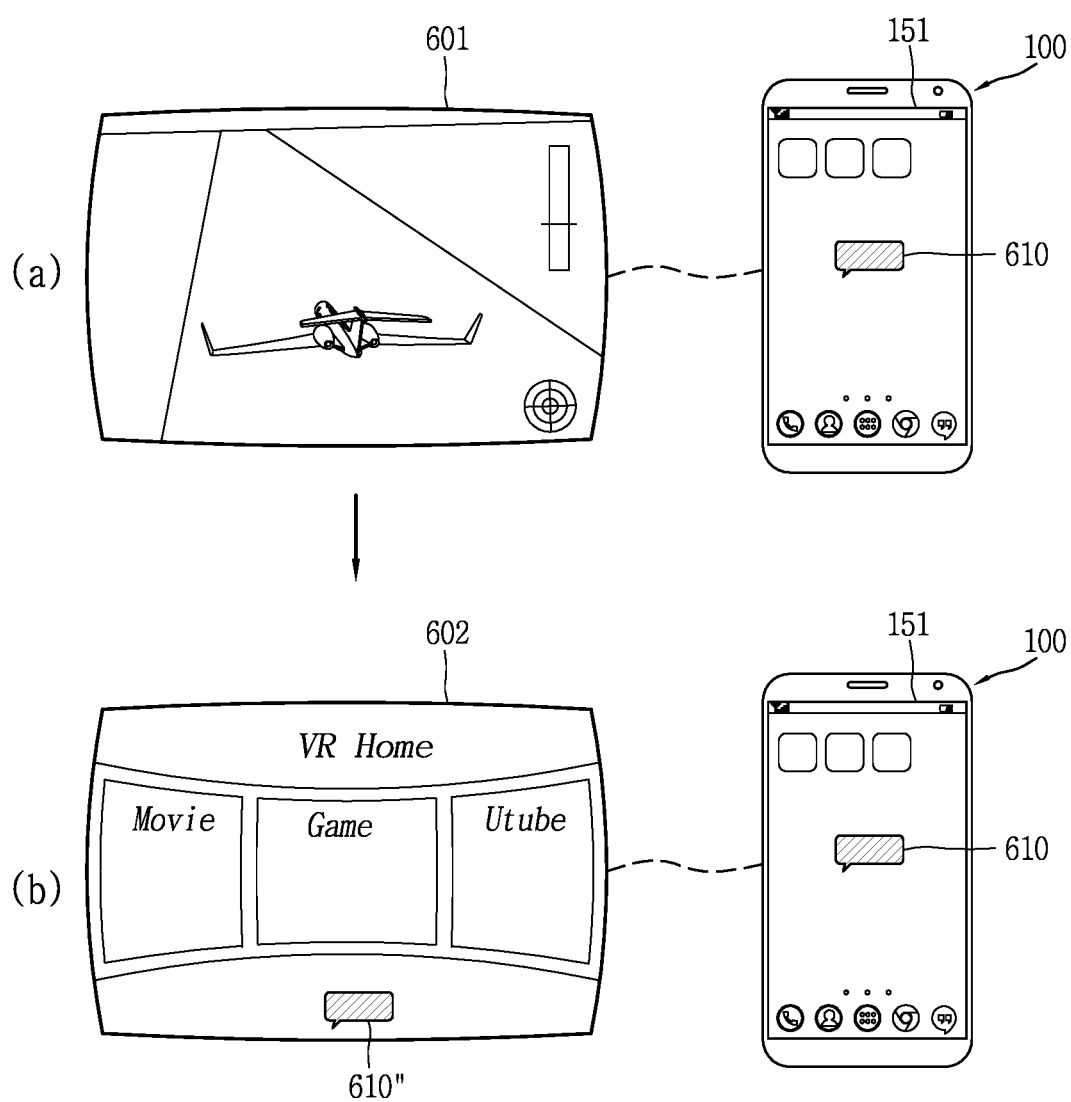
FIG. 6 is a conceptual view illustrating a representative embodiment of an operation of an HMD according to an embodiment of the present invention.
Figure 7A:
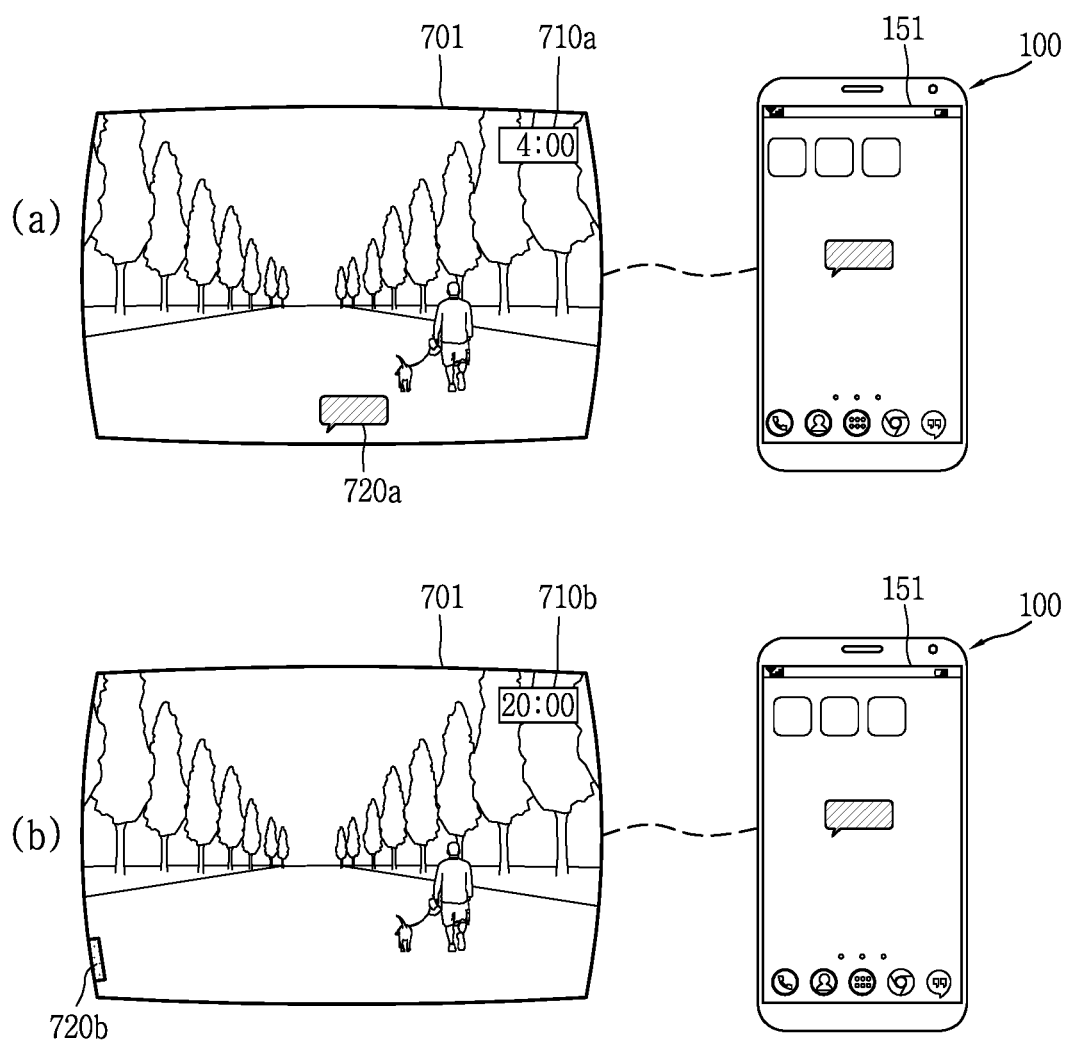
FIGS. 7A to 7D are views illustrating a method of outputting an event notification according to a type and an execution degree of a displayed content, in an HMD according to an embodiment of the present invention.
Figure 7B:
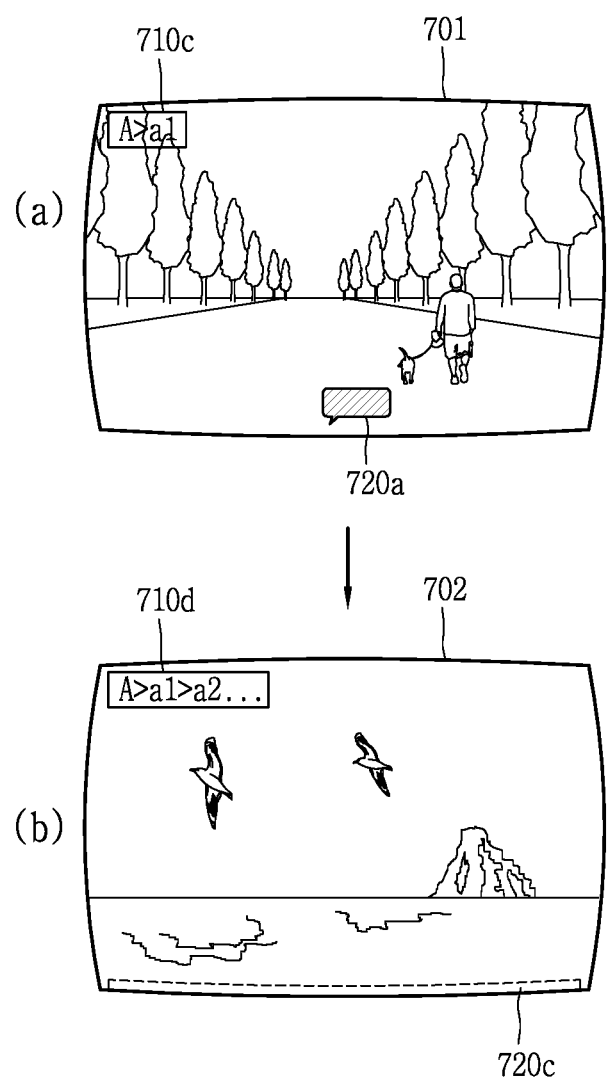
Figure 7C:
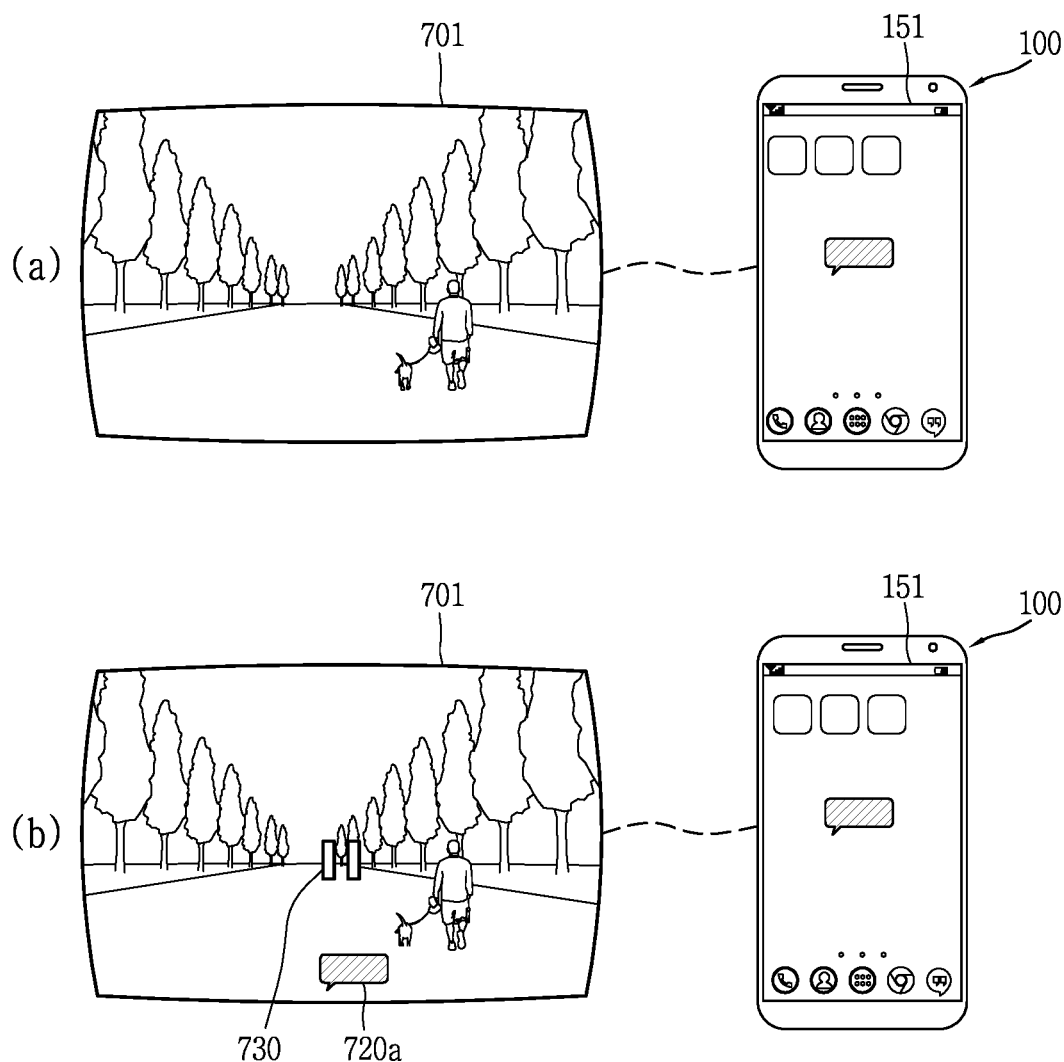
Figure 7D:
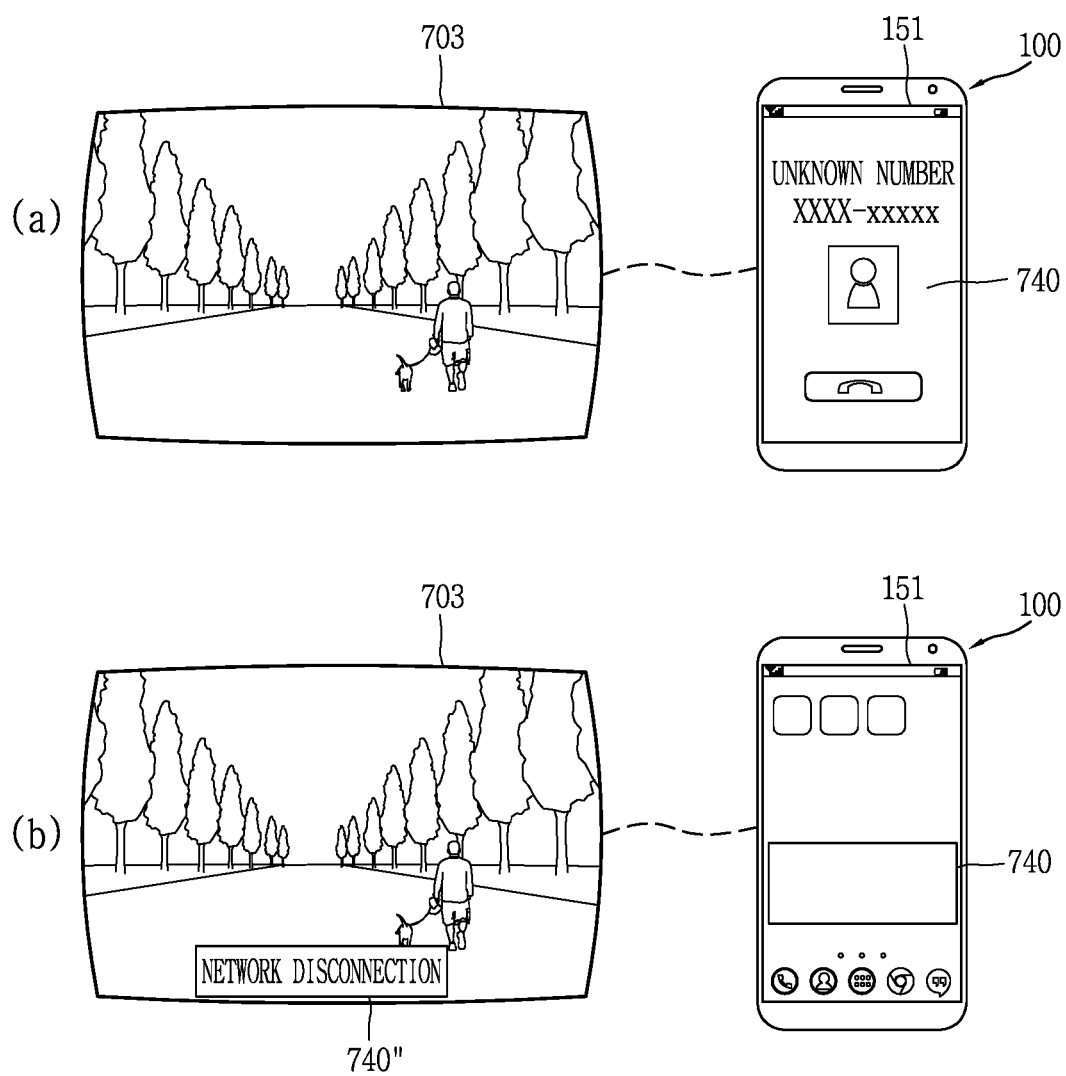

FIG. 6 is a conceptual view illustrating a representative embodiment related to the flowchart of FIG. 5. More specifically, (a) of FIG. 6 illustrates an event notification being restricted for a user's enhanced sense of immersion, and (b) of FIG. 6 illustrates the restricted state of the event notification being released. For instance, (a) of FIG. 6 illustrates when a specific event has occurred from the mobile terminal 100, from a specific application having the same type as a game content 601, while the game content 601 is being displayed on the display unit 251 of the HMD 200. In this instance, a notification icon 610 informing the event occurrence is output to a touch screen 151 of the mobile terminal 100, but is not output to the display unit 251.

In addition, if a content type is a sound source play which is output in an audible manner rather than in a visible manner, for instance, the controller 280 cannot output a specific notification method of an event (e.g., a notification sound) to the display unit 251, whereas it outputs a notification icon indicating an event occurrence while a related image (e.g., a music video) is being displayed on the display unit 251.

Further, as shown in (b) of FIG. 6, if a home screen 602 is displayed as the game content 601 is terminated, or if the execution of the game content 601 is temporarily stopped, or if a content not requiring a user's sense of immersion is displayed on the display unit 251, the restricted state of the event notification is released. Thus, as shown in (b) of FIG. 6, the same notification icon 610" as that on the mobile terminal 100, or a notification icon having a different image can be popped-up on a set position. In this instance, if a plurality of events have been received while the event notification is restricted, the notification icon 610" can be displayed in the form of an integrated image of a plurality of layered icons.

In addition, the controller 280 (or the controller 180 of the mobile terminal 100) can differently provide an event notification level according to each content. The event notification level may mean a restriction degree of an event type to which a push notification is applied when an event occurs, or a notification degree of a push notification. For instance, if an event notification level is low, the number of events to which push notifications are applied is small, and a notification degree of a push notification is low. For instance, for a movie, a game, a lecture video, etc. each requiring a user's high sense of immersion, a minimized event notification level can be provided. Further, for a home screen, an address book screen, an execution screen of a web application, etc. each requiring a user's low sense of immersion, a maximized event notification level may be provided.

Next, FIGS. 7A to 7D are views illustrating a method of outputting an event notification according to a type and an execution degree of a content displayed on the HMD 200 according to an embodiment of the present invention. Even when notifications of some events are output according to a content type, the controller 280 of the HMD 200 can differently control an object image indicating an event occurrence, based on an execution degree of a content being displayed. The execution degree of the content may include at least one of an execution time, an execution frequency (number of times), an execution state, and an entry degree to a lower content of the content. For example, the controller 280 can predict a degree of a user's sense of immersion, based on an execution degree of the content being displayed, and then generate a corresponding object image.

In an embodiment, the controller 280 of the HMD 200 can differently control a display position of an object indicating an event occurrence, based on an execution time of a displayed content. Referring to (a) of FIG. 7A, if an event occurs at a time point (710a) when a play degree of a content corresponds to '4:00' min, while a video 701 is being displayed on the display unit 251 of the HMD 200, an object indicating an event occurrence may be displayed on a preset region, e.g., a lower middle region of the display unit 251 (720a). Further, referring to (b) of FIG. 7A, if the same event or the same type of event occurs at a time point (710b) when a play degree of the content corresponds to '20:00' min, the controller 280 determines that a degree of a user's sense of immersion has increased. Accordingly, the controller 280 can display an event notification on a position not to disturb the user's sense of immersion, e.g., an edge of the display unit 251 (e.g., a left lower region) in a small size (720b).

In addition, at a specific time point of a video being played, e.g., at a scene or a section where a user's sense of immersion is increased, a display method of an object indicating an event occurrence can be changed such that a user's sense of immersion is not disturbed. For example, the controller 280 can recognize a scene or a section where a user's sense of immersion to a video being played is increased, based on meta data received together with a video content.

In another embodiment, the controller 280 of the HMD 200 can differently change an object image indicating an event occurrence based on an entry degree to a lower content. For instance, referring to (a) of FIG. 7B, if an event occurs while a user enters (710c) a lower content lower by two levels than a specific page corresponding to execution of a web application, an object indicating an event occurrence can be displayed on a preset region, e.g., a lower middle region on the display unit 251 of the HMD 200 (720a). Further, referring to (b) of FIG. 7B, if an event occurs when a user has entered (710d) a lower content lower by more than a reference level (e.g., 4 levels), the controller 280 determines that the user's sense of immersion has increased.

Accordingly, the controller 280 can change the event notification to a different visual effect (e.g., a glow effect), and then display the different visual effect on a lower end of the display unit 251, for instance. In addition, the controller 280 can control an object image indicating an event occurrence, based on the number of times of movement along a link on a specific page corresponding to execution of a web application.

In another embodiment, the controller 280 of the HMD 200 can restrict display of an object indicating an event occurrence, or immediately release the restricted state of the object, according to an execution state of a content. Referring to (a) of FIG. 7C, while a video 701 is being displayed on the display unit 251 of the HMD 200, display of an event notification may be restricted. Then, referring to (b) of FIG. 7C, if the execution state of the video 701 is changed into a temporarily stopped state 730, the restricted display state of the event notification can be released. As a result, the object of which display has been restricted can be displayed (720a), and/or an event notification generated during the temporarily stopped state 730 can be displayed.

In another embodiment, when an event related to a change of an execution state of a content occurs, for instance, when a system error, a network disconnection, a battery shortage or the like occurs, the controller 280 can display an object image indicating an event occurrence, in an emphasized manner. For instance, as shown in (a) of FIG. 7D, while a network of a video content 703 being played is normal, display of an event notification can be restricted. Further, as shown in (b) of FIG. 7D, if a stream downloading or a play of the video content 703 being played is stopped due to a network disconnection, the execution state of the video content 703 can be changed, and a notification icon 740" indicating occurrence of a corresponding event can be displayed. In this instance, event-related information (e.g., 'network disconnection') can be displayed on the notification icon 740".

In another embodiment, while a content displayed on the display unit 251 of the HMD 200 is in an input step for storing specific information, display of an event notification can be delayed until the input is terminated or cancelled. In another embodiment, when a call signal is received from the mobile terminal 100 while a game content is being displayed on the HMD 200, if the call signal corresponds to contact information stored in a phone book, the controller 280 can display an object indicating that the call signal is being received (or output a flickering effect on a game screen), or may output a preset sound. Further, if the call signal does not correspond to the contact information stored in a phone book, the controller 280 can ignore the call signal.

While the object indicating that the call signal is being received is being displayed, for maintenance of a user's sense of immersion, the user can respond to the call signal through the touch screen 151 of the mobile terminal 100, when the display state of the game content is maintained.

In another embodiment, while a content is being displayed on the display unit 251, the controller 280 can turn off the display unit 251 such that an output of all push notifications is restricted, based on a user's input (e.g., an input of a touch gesture to the touch screen 151 of the mobile terminal 100 with a preset pattern). In this instance, if the displayed state of the content is terminated, the restricted state of the output of all push notifications is automatically released. Thus, the display unit 251 can return to the previous state.

In another embodiment, the controller 280 can change an image of an object indicating an event occurrence, or change a display range and whether or not to display the object, according to whether an execution mode of a content displayed on the display unit 251, e.g., a game execution mode of a first person narrative or a multi-person narrative. For instance, in a game execution mode of a first person narrative, whether to display an object or not, and a display range of the object may be more restricted, since a sense of immersion of a user who has worn the HMD 200 should be more maximized.

In the present invention, when an event notification is selectively displayed according to a type of a content being displayed on the HMD 200, a different event notification method is applied based on an execution degree of the content. This may provide an event notification more suitable for a degree of a user's sense of immersion to the content.

Figure 8:
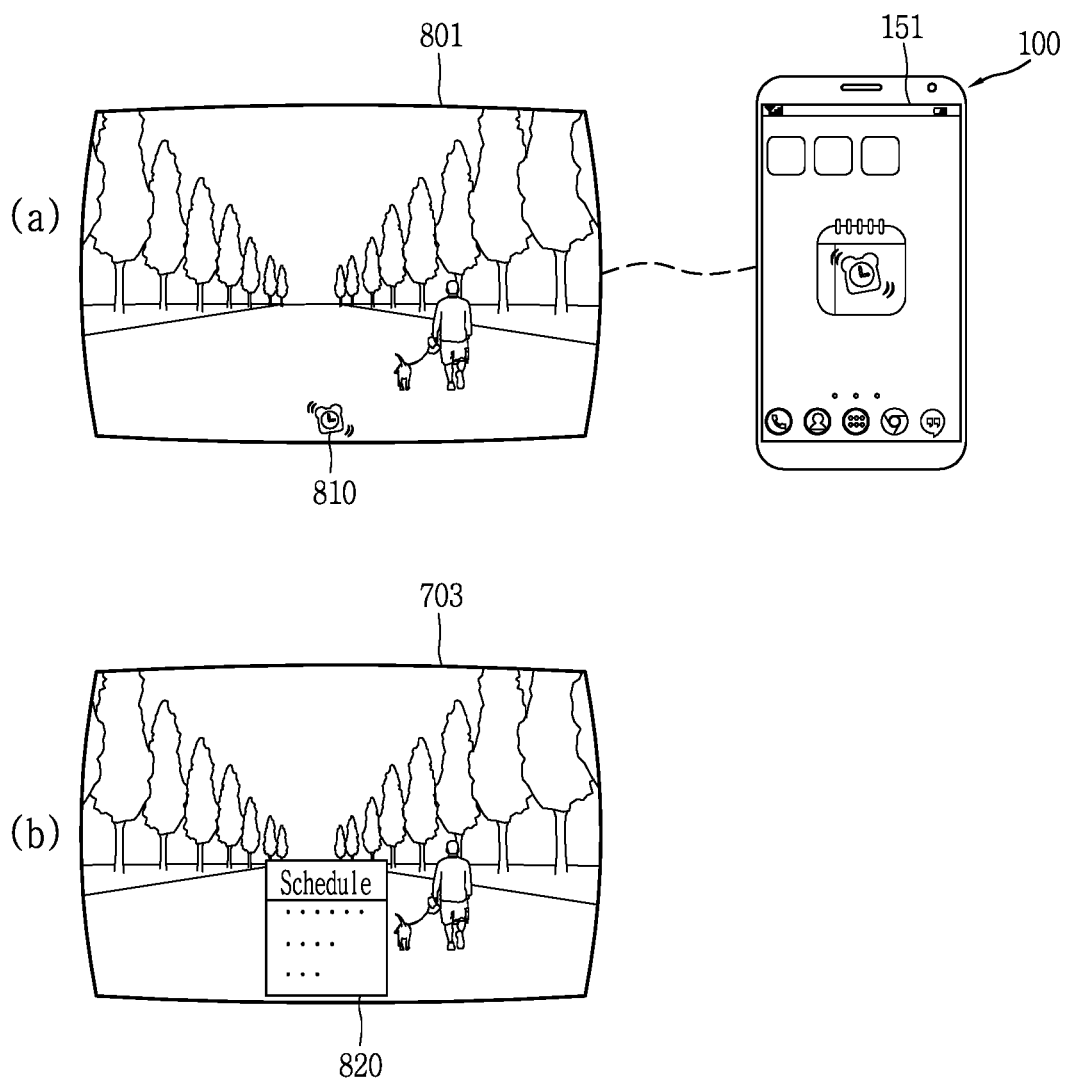
FIG. 8 is a conceptual view illustrating an event notification displayed regardless of a content type, in an HMD according to an embodiment of the present invention.

Next, FIG. 8 is a conceptual view illustrating an event notification displayed on the HMD 200 regardless of a content type. More specifically, while a content is being displayed on the display unit 251 of the HMD 200, a notification of an event which satisfies a specific condition and which is generated from a preset application can be displayed without any limitation. Here, the specific condition is preset according to a user's input, and may include a specific time, a specific position, a downloading of a specific program, or a thing having high importance and requiring an urgent handling such as an urgent message and a call signal repeatedly received from the same contact information.

Referring to FIG. 8, when schedule information is pre-input through a calendar application installed to the mobile terminal 100, if it is time corresponding to the pre-input schedule information, the controller 280 can output notification information 810 which induces check of the schedule information, to the display unit 251 of the HMD 200, regardless of a type of a displayed content 801. In this instance, if a user's eye line is fixed to the notification information 810 for a predetermined time, schedule information 820 may be immediately popped-up. In another embodiment, for a user's sense of immersion, the schedule information may not be displayed, but audio information may be output through the audio output unit 252 in the form of a voice prompt.

In addition, even for a notification of an event which satisfies the specific condition, the controller 280 can output an event notification with a predetermined time difference, according to an execution state of a content displayed on the HMD 200. For instance, if an event occurs at an important scene, the controller 280 can wait for a predetermined time such that an event notification may be output after the scene passes.

The controller 280 can output an event notification by changing or gradually intensifying a notification degree, according to an execution state of a content displayed on the HMD 200. For instance, if a call signal is received from contact information stored in a phone book while a user is viewing a game content, a glow effect or a flickering effect is firstly output ('first notification'). Then, if a predetermined time lapses, a phone icon ('second notification') is displayed on the HMD 200. Then, a sound of a phone ring ('third notification') is output.

As aforementioned, while a user is appreciating a content through the HMD 200, a notification is provided with respect to a specific event requiring the user's check. This allows the user not to miss a preset event or an important event while appreciating the content through the HMD 200.

Figure 9A:
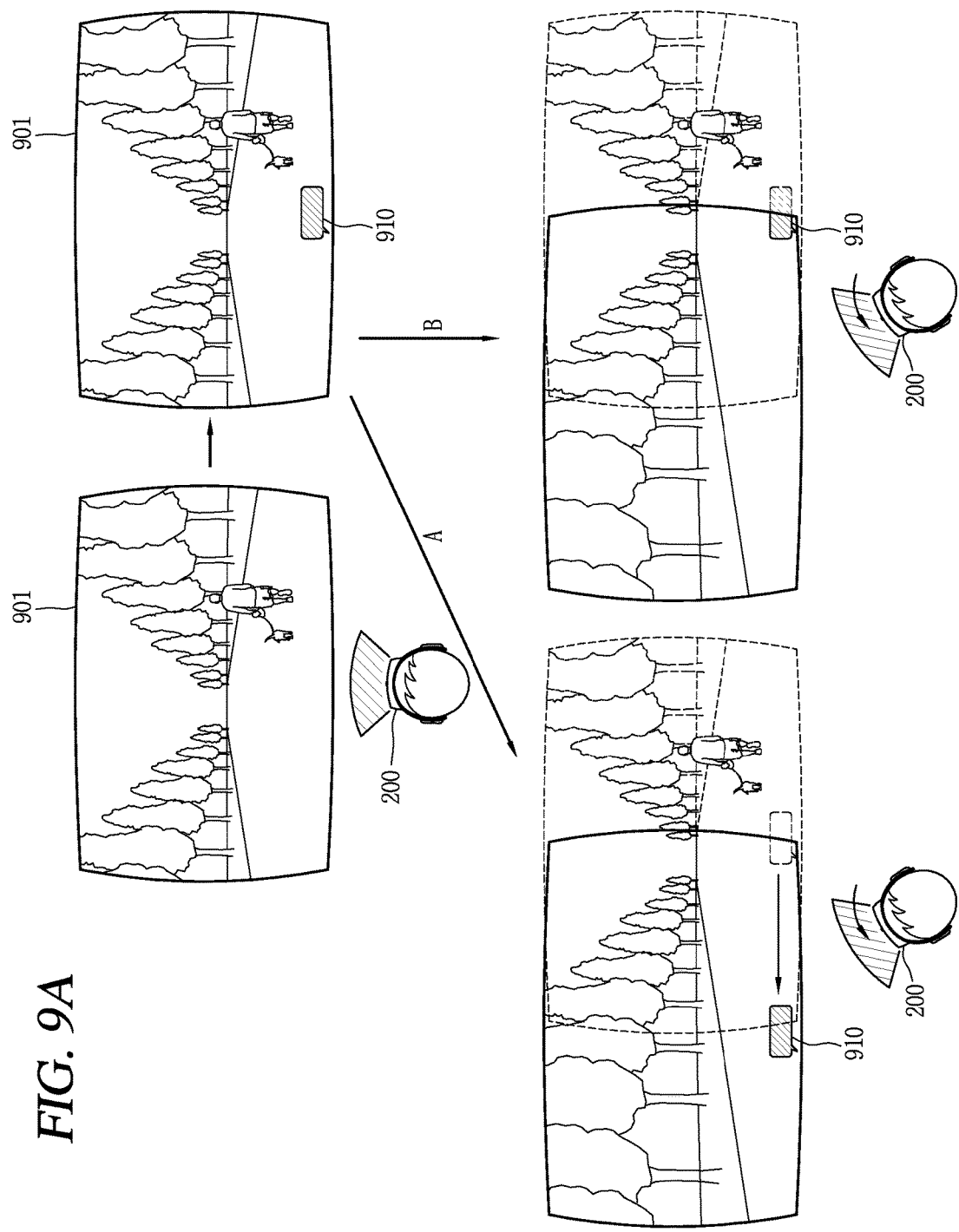
FIGS. 9A and 9B are views illustrating examples to control an event notification selectively provided and to check event information, based on an input to an object, in an HMD according to an embodiment of the present invention.

Next, FIG. 9A is a view illustrating a displayed state of one region of a virtual space video screen which may be formed in all directions (e.g., 360°) based on a user, on the display unit 251. In such a displayed state, if an event occurs from at least one application installed to the mobile terminal 100 connected to the HMD 200, the controller 280 of the HMD 200 (or the controller 180 of the mobile terminal 100) can determine whether to display a notification of the event.

For instance, the event notification can be displayed only on the mobile terminal 100, without being displayed on the display unit 251 of the HMD 200. When the controller 280 has decided to display the event notification, the controller 280 can control the event notification to be displayed on the mobile terminal 100 and the HMD 200, as different images.

The controller 280 can determine whether to display the event notification or not, and a display method of the event notification, based on importance of an event. Further, the controller 280 can determine whether to display the event notification or not, based on a type of a content displayed on the display unit 251, together with importance of an event.

For example, the controller 280 (or the controller 180 of the mobile terminal 100) can provide a different event notification level according to each content. The event notification level may mean a restriction degree of an event type to which a push notification is applied when an event occurs, or a notification degree of a push notification. For instance, if an event notification level is low, the number of events to which push notifications are applied is small, and a notification degree of a push notification is low.

For a movie, a game, a lecture video, etc. each requiring a user's high sense of immersion, a minimized event notification level can be provided. Further, for a home screen, an address book screen, a home screen of a specific web address in a web application, etc. each requiring a user's low sense of immersion, a maximized event notification level can be provided.

As aforementioned, the controller 280 can change whether to display an event notification, based on an execution state of a content. For instance, when a user is appreciating a film through the display unit 251 of the HMD 200, a setting can be automatically changed such that event notifications can be displayed limitedly according to a minimum event notification level, for a sense of immersion while the film is being played. Then, if the play of the film is stopped, all of the event notifications can be displayed. If the play of the film is resumed, the event notifications can be displayed limitedly.

For instance, referring to FIG. 9A, an object indicating an event occurrence is popped-up on a preset region of a displayed video screen 901, e.g., a lower end of a surface in front of a user, as an image 910 of a speech balloon form. However, the shape of the object indicating an event occurrence is not limited to this, but may be implemented variously. And the object may be changed in shape, size or position, according to a type of an occurred event.

If a user's head gesture or head movement is sensed by the sensing unit 240 when the object indicating an event occurrence has been popped-up (or at the same time when the object is popped-up), the controller 280 can control the displayed content in correspondence to the user's head movement, and differently process the popped-up image 910 based on a user's input.

More specifically, if the user's head is moved toward one direction (e.g., the left side), the controller 280 can control a region of the displayed video screen 901 (e.g., a right region) to partially disappear, and control another region of the virtual space to appear on the display unit 251. That is, one region of the virtual space content can be converted into another region according to a user's head movement.

If a preset input is applied to the popped-up image 910 when a user's head gesture is applied or before and after the user's head gesture is applied, the popped-up image 910 can be processed as shown in 'A' of FIG. 9A. The preset input includes all types of inputs by which it may be determined that the user is interested in the popped-up image 910, i.e., an event notification. For instance, the preset input may be one of an eye line fixation to the popped-up image 910, a touch input to the touch screen 151 of the mobile terminal 100, a push input to a specific key of the HMD 200 or the mobile terminal 100, or a preset voice command.

More specifically, if a user's eye line is fixed to the popped-up image 910 for a predetermined time, the controller 280 can determine that the user is interested in a corresponding event. Then, the controller 280 can control the screen such that the popped-up image 910 may follow the initial position or region. That is, the popped-up image 910 follows the user's head movement. Accordingly, a visual effect that a pointer seems to follow the user's head can be provided.

In this instance, a moving speed of the popped-up image 910 may correspond to a moving speed of the user's head gesture, or a display speed of another region of the virtual space according to the user's head gesture. Further, while the popped-up image 910 moves along the user's head gesture, the popped-up image 910 can be differently changed, or an animation effect, that the popped-up image 910 seems to be blown by wind, can be applied to the object. In this instance, the popped-up image 910 is continuously displayed on the screen without disappearing, until a user's additional input is applied. This allows the user to check an event.

Further, if no input is applied to the popped-up image 910 while the user's head gesture is applied, the popped-up image 910 can be processed as shown in 'B' of FIG. 9A. As shown, while another region of the virtual space gradually appears according to the user's head gesture, the popped-up image 910 is fixed to the initial position regardless of the head gesture. That is, the popped-up image 910 is processed like the object which exists on one region of the virtual space. And the popped-up image 910 fixed to the initial position disappears from the screen or the virtual space when a predetermined time lapses.

As aforementioned, in the present invention, for an enhanced sense of immersion to a content displayed on the HMD 200, an event notification is selectively provided. And even when another space is displayed according to a user's head movement, an event notification in which the user is interested is continuously displayed along the user's head movement. This enhances the user's sense of immersion, and satisfies the selected event notification.

FIG. 9A illustrates an example to display one region of a virtual space on the display unit 251 of the HMD 200. However, in this instance, a received content can be displayed as a 2D content. For instance, if a specific web page displayed on the display unit 251 is turned over to the next/previous page according to a user's head gesture, the popped-up object is continuously displayed by moving to the next/previous page, in the case of 'A' of FIG. 9A. Here, a visual effect that the object moves in a screen conversion direction, e.g., a page turning direction can be provided.

Further, in the case of 'B' of FIG. 9A, when a page is turned over, the previous page is turned over together with the object. Then, if a predetermined time lapses, the object disappears. If the current page is turned over to the previous page within a predetermined time, the object which has disappeared can reappear together with the previous page.

For instance, when a first content is displayed on the display unit 251 and a second content is executed by being overlapped with at least part of the first content, the popped-up object may not completely disappear, but can be displayed as its attribute is changed for a predetermined transparency.

In the present invention, for an enhanced sense of immersion of a user who has worn the HMD 200, notifications of some events can be restricted according to a type of a content displayed on the HMD 200. For instance, when a message or a call signal is received from contact information not stored in an address book of the mobile terminal 100, an advertisement message, etc. can have its notification restricted. When a specific event occurs according to a type of a content displayed on the HMD 200 and a type of an occurred event, e.g., when a notification related to a system error (e.g., battery deficiency, network disconnection, etc.) is received or when a call signal is received from one of most contacted persons, an urgent message, etc. can selectively have a notification to be displayed.

In addition, the controller 280 can differently determine an image of an object indicating an event occurrence, according to a type of a content displayed on the HMD 200 and a type of an event. Here, a change of the image of the object may mean a change of the object in shape, size, color, transparency, etc. For instance, if a type of a content displayed on the HMD 200 requires a relatively higher sense of immersion, an object indicating an event occurrence is displayed in a small size or a changed shape, for prevention of disturbance of a user's sense of immersion.

The controller 280 can display only objects corresponding to some events while a content is being displayed on the HMD 200, and display notifications corresponding to all events when the display state of the content is terminated. In this instance, a trigger signal for displaying notifications corresponding to all events when the display state of the content is terminated can be generated.

Once an object indicating an event occurrence is popped-up on the content displayed on the HMD 200, the popped-up object disappears when a predetermined time lapses. A user can check event information before the popped-up object disappears.

Figure 9B:
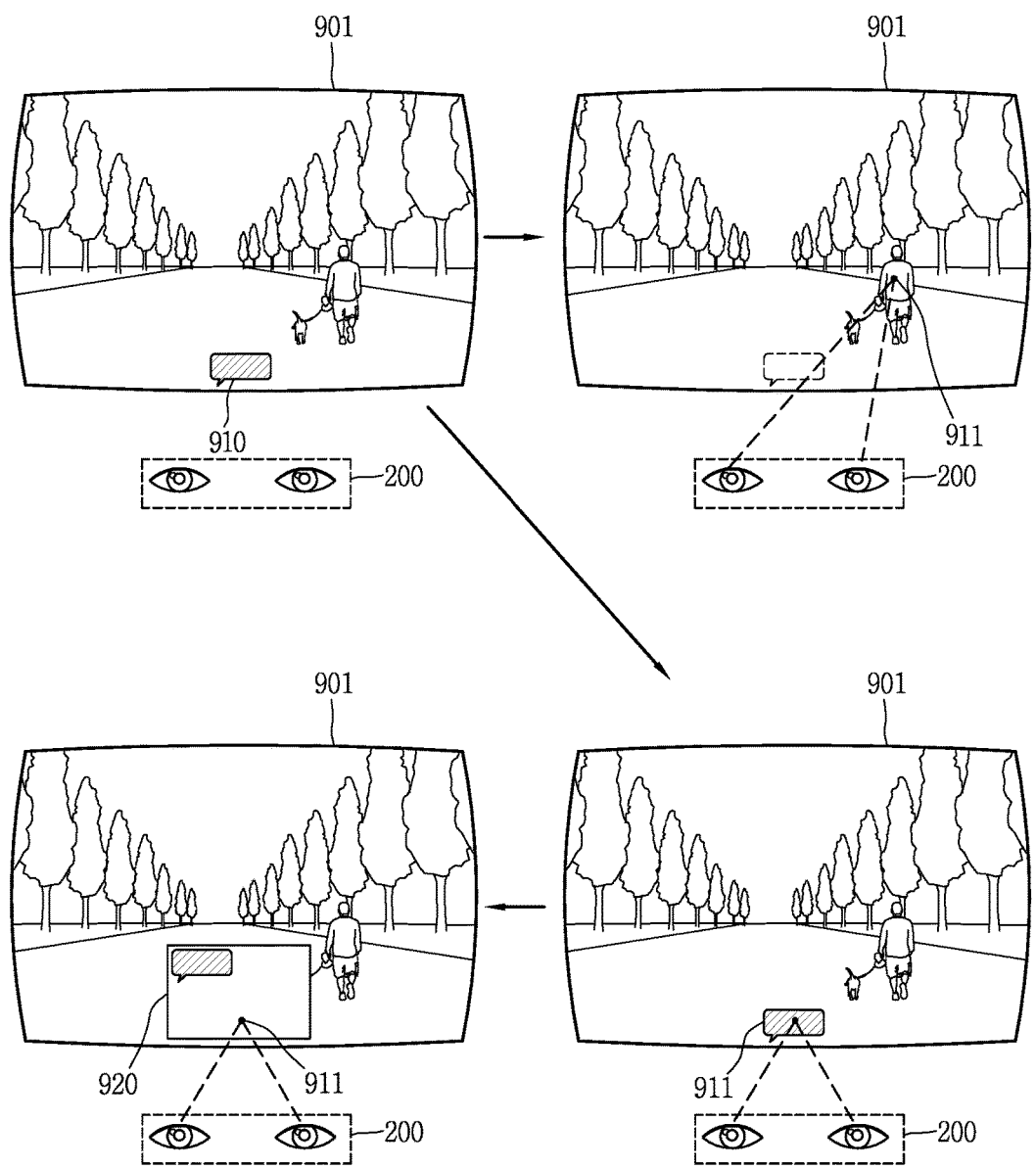

Next, FIG. 9B is a view illustrating an example of an event process where a user's eye line process is used as a user input. For instance, when an object 910 indicating an event occurrence is popped up while a video play screen 901 is displayed on the display unit 251 of the HMD 200, if a user's eye line is fixed to the popped-up object 910 for a first reference time (e.g., 1 second), the controller 280 can determine that a preset input has been received. Accordingly, the controller 280 can change the object 910 into a corresponding image 920. The changed image 920 can be provided with a selection mark or a shadow effect. Alternatively, the changed image 920 may be provided with an image indicating an application corresponding to an event. Then, the object 910 can continuously move along a user's head movement.

If a second reference time (e.g., 2 seconds) lapses when the object image has changed and the user's eye line has been fixed, the controller 280 displays information about the event corresponding to the object, on the display unit 251. Here, the event-related information may include part or all of information about an occurred event, an event execution state, an event occurrence time, and an execution screen of an application corresponding to an event. For instance, if a message reception event has occurred, the event-related information may be information of a received message, contact information of a sender who has sent a message, a message reception time, or a chat screen including a received message.

If a user's eye line is fixed to a specific position for more than a predetermined time, a pointer 911 is generated on a corresponding position. A control command applied to the object 910 can be generated by using the pointer 911 which moves along the user's eye line. If the pointer 911 is fixed within the object 910 for a predetermined time, the image of the object 910 is changed and a window 920 is displayed, the window where event-related information (e.g., a received message) is displayed. Further, if the user's eye line is not fixed to the object 910 for more than a predetermined time, the popped-up object 910 disappears.

In another embodiment, an event process can be executed based on a specific head gesture. For instance, if a user's head is moved up and down in a popped-up state of the object 910 ('first head gesture'), information about an event corresponding to the object 910 can be displayed. Further, if a user's head is moved right and left in a popped-up state of the object 910 ('second head gesture'), the object 910 may immediately disappear, or may move to be displayed on a boundary region where a sense of immersion is not disturbed.

Figure 10A:
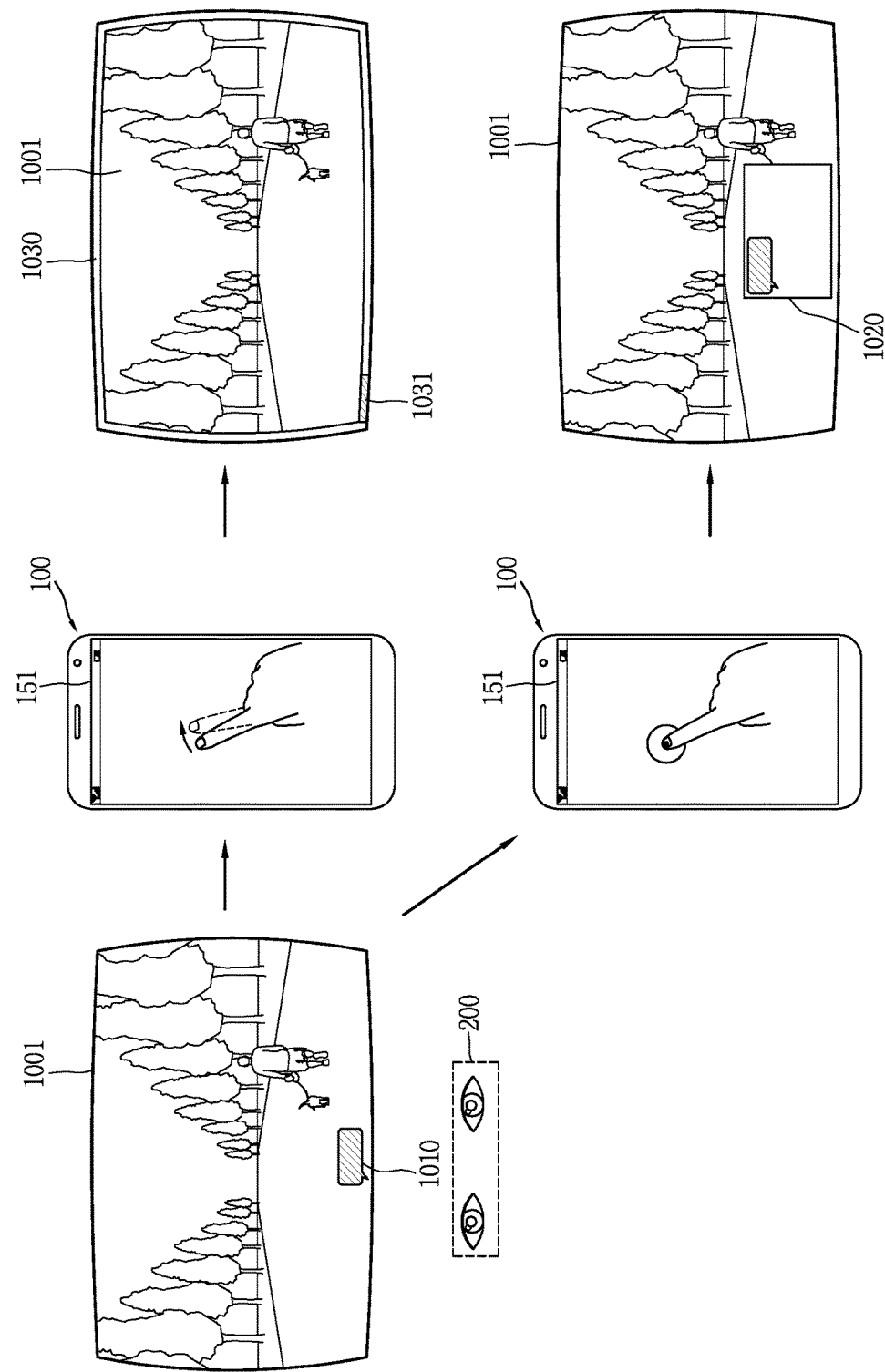
FIGS. 10A to 10C are views illustrating examples to store, call and check an event notification selectively provided, using an edge region of a screen, in an HMD according to an embodiment of the present invention.
Figure 10B:
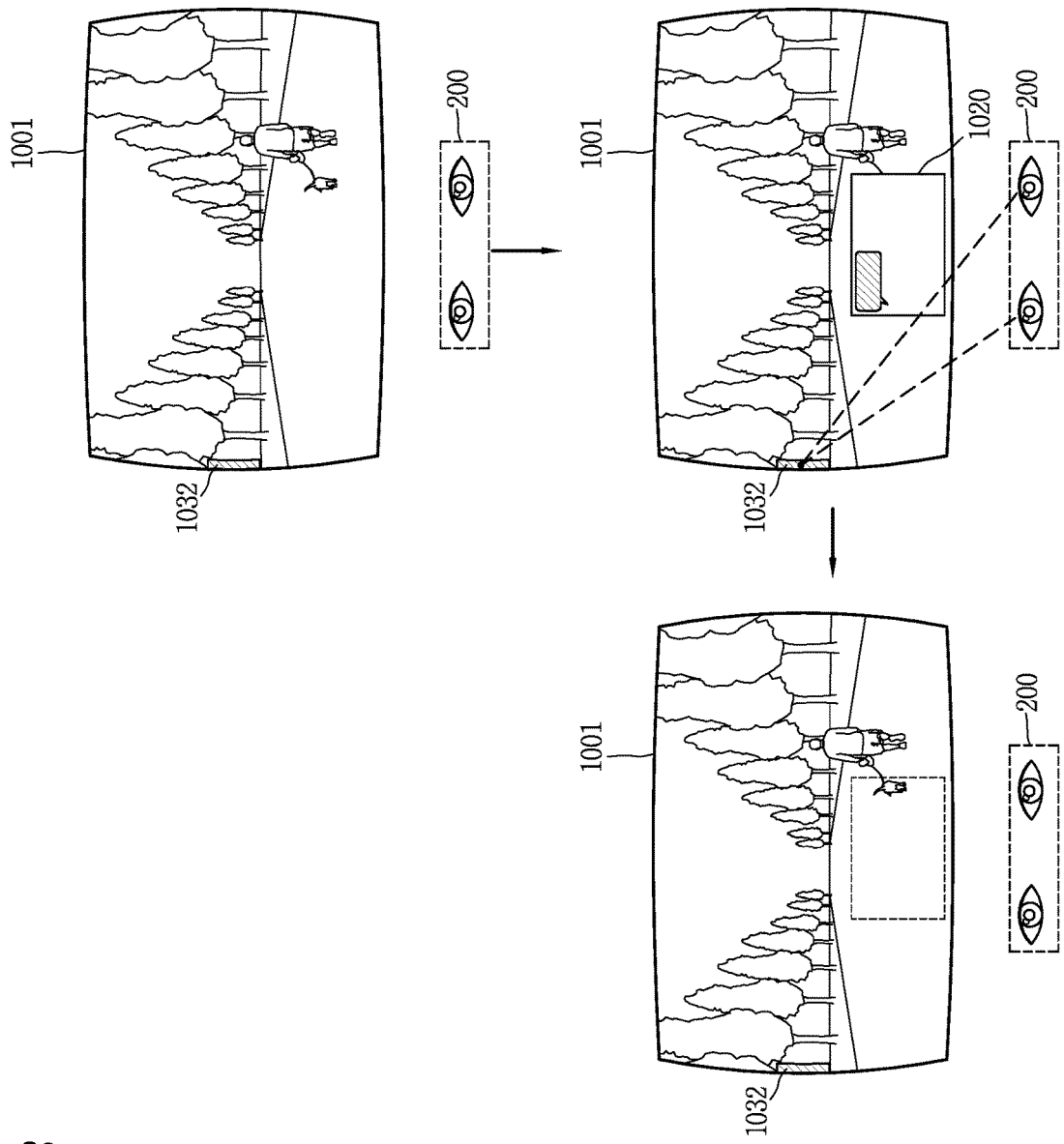
Figure 10C:
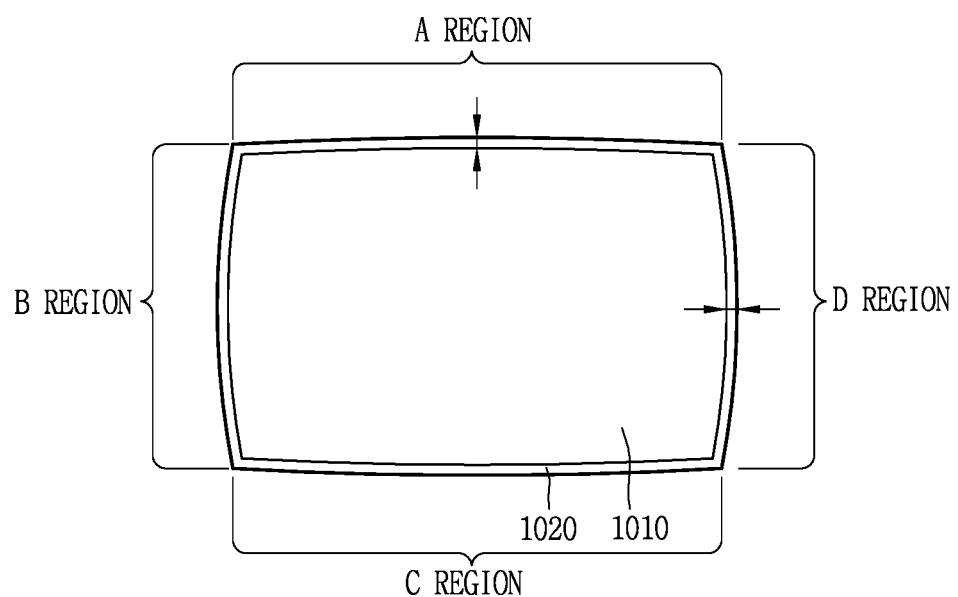

Next, FIGS. 10A to 10C are views illustrating examples to store, call and check an event notification selectively provided, using an edge region of a screen, in the HMD according to an embodiment of the present invention. A user, who wants to check a popped-up object later for prevention of disturbance of a sense of immersion, can store, call or check the popped-up object, using an edge region of a screen where disturbance of a sense of immersion is minimized.

Here, the control can be executed through an input to the touch screen 151 of the mobile terminal 100 connected to the HMD 200, or through an input to a specific key provided at the HMD 200. In a popped-up state of an object indicating an event occurrence on the HMD 200, a control command generated by an input applied to the touch screen 151 of the mobile terminal 100 or a specific key of the HMD 200, can be restricted to one with respect to the popped-up object. That is, if an input is applied to the touch screen 151 of the mobile terminal 100 or a specific key of the HMD 200 in a popped-up state of an object, it is recognized as an input of a control command with respect to the object.

If a control command is input to the touch screen 151 of the mobile terminal 100, the controller 280 can transmit, to the mobile terminal 100, a control command instructing conversion of the touch screen 151 into an active mode from a doze mode, at a time point when the object has been popped-up. In this instance, if the HMD 200 and the mobile terminal 100 are connected to each other by wire, a control command is transmitted to the controller 180 of the mobile terminal 100 through the interface units 160, 260. Further, if the HMD 200 and the mobile terminal 100 are wirelessly connected to each other, a control command is transmitted to the wireless communication unit 110 of the mobile terminal 100 through the wireless communication unit of the HMD 200.

Then, once a touch input is applied to any region on the touch screen 151 of the mobile terminal 100, it is recognized as a touch input applied onto the object popped-up on the display unit 251 of the HMD 200. That is, the popped-up object is pointed in response to a touch input firstly applied to the touch screen 151. More specifically, once a first touch signal generated as a touch input is firstly applied to the touch screen 151 of the mobile terminal 100 is transmitted to the HMD 200, the controller 280 of the HMD 200 controls the popped-up object to be pointed based on the transmitted first touch signal. Then, a control command is generated with respect to the object pointed based on a second touch signal generated as a subsequent touch input is applied to the touch screen 151.

Referring to FIG. 10A, when an object 1010 indicating an event occurrence has been popped-up on a content screen 1001 displayed on the HMD 200, if a first touch input (e.g., a plurality of taps knocking on the touch screen 151 a predetermined number of times) is applied to the touch screen 151 of the mobile terminal 100, a control command to hold an event without check ('first input signal') is generated. Then, the control command is transmitted to the HMD 200. Accordingly, the controller 280 of the HMD 200 can move the popped-up object 1010 to a set region, e.g., an edge region 1030, and then hold the popped-up object 1010 (1031).

Here, the object holding means that the position of the object is changed into an edge region for prevention of disturbance of a sense of immersion. And the object holding means that a position of the object is maintained as an edge region, even if another region of a content is displayed according to a user's head movement.

In this instance, for prevention of disturbance of a sense of immersion, the object held on an edge region 1030 can be displayed partially, or be changed into another graphic object to be displayed. An event process with respect to the object held on the edge region 1030 will be explained later.

The position of the object to be held may be changed according to a type of an application corresponding to an event. For instance, an object of an event generated from an application of a first group may be positioned on a left edge region, and an object of an event generated from an application of a second group may be positioned on a lower edge region. And an object of an event generated from an application of a third group may be positioned on a right edge region. A type of the applications which belong to the first to third groups may be classified based on a user's input or default setting information. In this instance, a user can recognize a type of an application where an event is generated, in an intuitive manner, based on a position of an edge region where the object has moved.

The position of the object to be held may correspond to a time order of event occurrence. For instance, if a first event is generated from an application which belongs to the first group, a first object may be positioned at an upper side of a left edge region. And if a second event is generated from an application which belongs to the same group, a second object may be positioned below the first object. That is, objects may be positioned in a specific direction (e.g., from the upper side to the lower side), in a time order of event occurrence. With such a configuration, a user can recognize an event which has been stored long time ago, or an event which has been stored recently, in an intuitive manner.

A color of the object to be held may be differently controlled according to a storage time or an importance of a corresponding event. For instance, an object corresponding to an event having high importance is displayed in red, and an object corresponding to an event having low importance is displayed in a similar color to a background color of a content. With such a configuration, a user can intuitively recognize an object corresponding to an event having high importance or an event which has been stored for a long time, among objects which have moved to the edge region.

Referring to FIG. 10A, in a popped-up state of the object 1010, if a second touch input (e.g., a long press touch input or a touch input having more than a reference pressure) is applied to the touch screen 151 of the mobile terminal 100, a control command ('second input signal') for checking event-related information is generated. Then, the generated control command is transmitted to the HMD 200. Accordingly, a window 1020 where event-related information (e.g., a received message) has been displayed, appears on the popped-up position of the object 1010.

The window 1020 can be displayed only when a second touch input is applied to the touch screen 151, or when the second touch input is maintained. In this instance, if the second touch input is released, the window 1020 disappears from a viewing angle of the HMD 200, and the object 1010 is not displayed any longer since an event check has been performed. Accordingly, a user can immediately appreciate the content through the HMD 200 with a sense of immersion.

An amount of event-related information may be variable based on a touch degree of a second touch input applied to the touch screen 151, or a time duration for which the second touch input has been maintained. For instance, if a touch degree of the second touch input is increased, a size of the window 1020 is also increased proportionally. As a result, a larger amount of event-related information can be displayed. In this instance, if the touch degree of the second touch input is more increased, the currently-displayed content may be converted into an application execution screen corresponding to the window 1020. In this instance, if the second touch input is released, the application execution screen returns to the previously-displayed content automatically.

Accordingly, a user's sense of immersion to the content may be immediately restored. Once an event corresponding to the popped-up object is processed, the touch screen 151 of the mobile terminal 100 may be automatically converted into a doze mode from an active mode for saving of the battery.

FIG. 10B is a view illustrating an example to check an event of an object stored on an edge region. Referring to FIG. 10B, if a graphic object 1032 corresponding to an event is displayed on an edge region of the display unit 251, generated is an environment where a factor to prevent a sense of immersion to a content 1001 is removed, and where a corresponding event is immediately checkable. Here, the graphic object 1032 may be changed into a queue image or a glow effect which informs a stored state of an event, for maximization of a sense of immersion.

In this instance, the content 1001 displayed on the display unit 251 is controlled in correspondence to a user's head movement, and the graphic object 1032 displayed on the edge region of the display unit 251 maintains the displayed state despite the user's head movement. As aforementioned, when the graphic object 1032 is displayed on the edge region of the display unit 251, the controller 280 can control the graphic object 1032 to be displayed on a different edge region, according to a type of an event or an application corresponding to the event.

For instance, as shown in FIG. 10C, an edge region 1020 of the display unit 251 may be divided into a plurality of regions, e.g., 4 regions (region 'a', region 'b', region 'c', and region 'd') in upper, lower, right and left directions. The regions 'a', 'b', 'c' and 'd' may be set according to an event attribute (e.g., importance) or an event type, or according to an application corresponding to an event. Alternatively, the regions 'a', 'b', 'c', and 'd' may be differently arranged according to a user's setting. And a width of each of the regions 'a', 'b', 'c' and 'd' may be variable according to a content type or a content execution state.

Referring to FIG. 10B again, if a user's eye line is fixed to the graphic object 1032 displayed on the edge region of the display unit 251 for a predetermined time, information 1020 related to an event corresponding to the graphic object 1032 (e.g., a received message) is displayed at least partially. While the event-related information is displayed, the content being executed may be stopped temporarily. For instance, an execution state of a video being played may be automatically changed into a temporary pause state.

Then, if a predetermined time lapses or if the user's eye line fixed to the information 1020 is moved, the even-related information 1020 may disappear from the display unit 251. And as shown in FIG. 10B, the graphic object may be re-played at the previous position on the edge region. Alternatively, the graphic object may not be displayed on the edge region any longer after the corresponding event is checked. And an execution state of the content is automatically changed into the previous state.

As aforementioned, an object is continuously displayed on a specific edge region, based on a type of an event generated while a content is being displayed on the HMD 200. This may call a user's attention, and allows the user to have a maximized sense of immersion to the content.

Figure 11A:
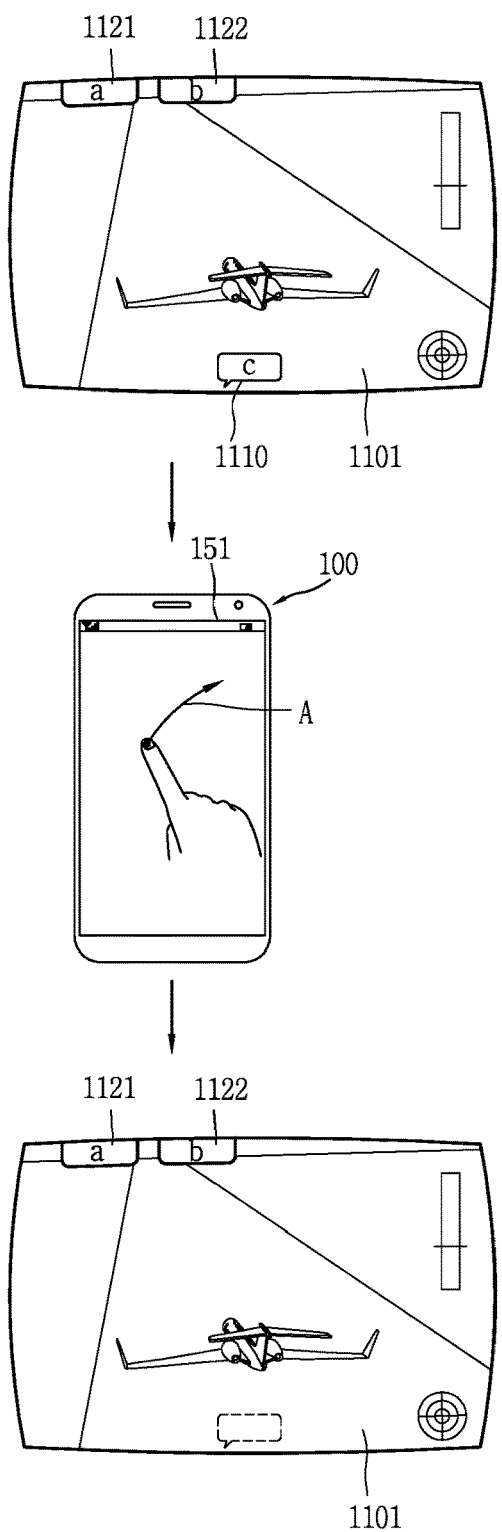
FIGS. 11A and 11B are views illustrating examples to delete or move an event selectively provided, using a touch input, in an HMD according to an embodiment of the present invention.
Figure 11B:
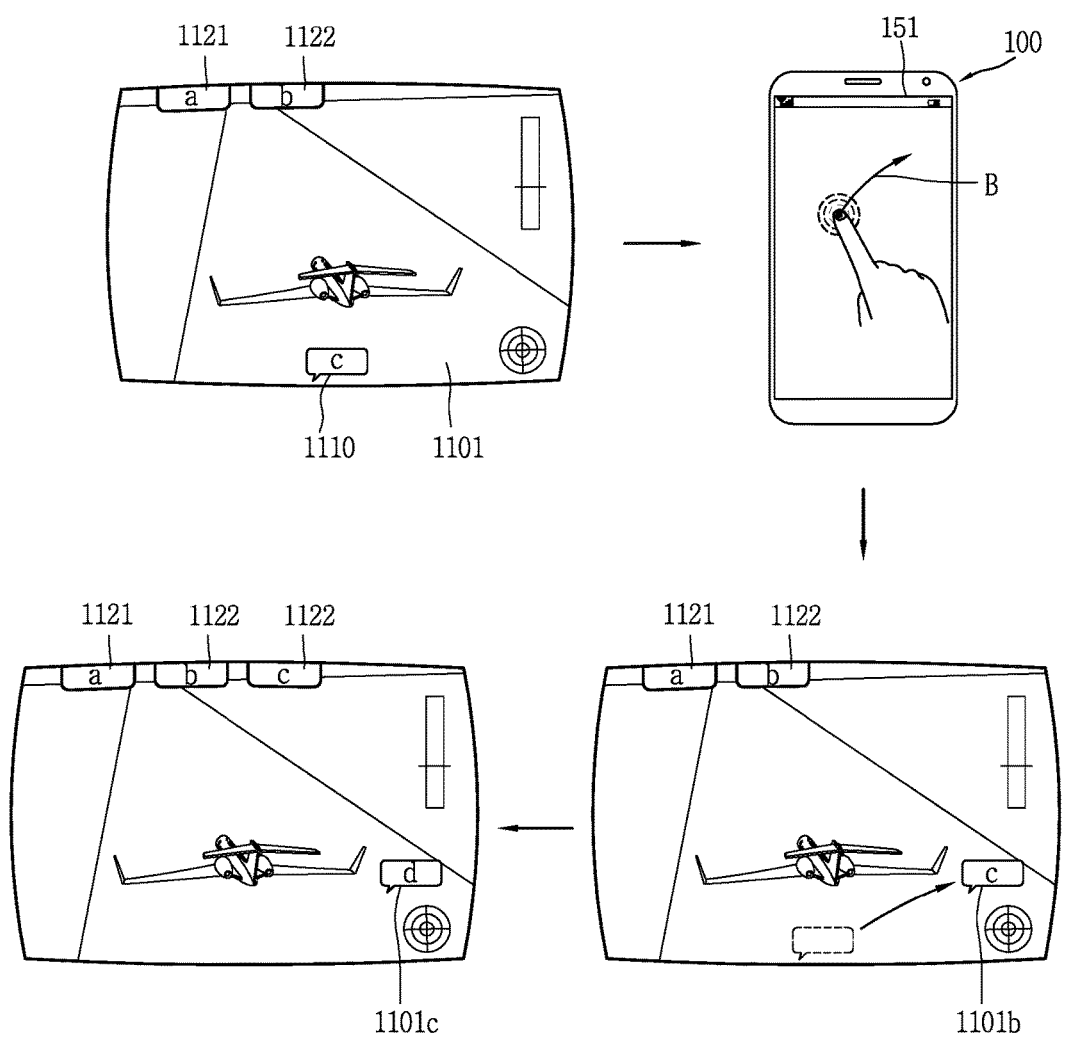

Next, FIGS. 11A and 11B are views illustrating various examples to control an event notification using a touch input to the mobile terminal 100 connected to the HMD 200 according to an embodiment of the present invention. FIG. 11A is an example to immediately remove an event notification 1110 which disturbs a sense of immersion, while a game is being executed on the HMD 200. In a popped-state of an object indicating an event occurrence, if a first signal corresponding to a first touch gesture applied to the touch screen 151 of the mobile terminal 100 connected to the HMD 200 (e. g., an upward flicking touch input 'A') is received, the controller 280 of the HMD 200 can immediately remove the popped-up object 1110. Unlike other events (a, b), the popped-up object disappears from the screen without being displayed on an edge region.

A starting position of the first touch gesture on the touch screen 151 may be any position. That is, as aforementioned, a touch gesture applied to the touch screen 151 while an event notification is displayed on the HMD 200 is processed as an input with respect to the event notification. Thus, the controller 280 has only to determine whether the object has been popped-up at a time point when the first signal has been received on the HMD 200, without correlating the starting position of the first touch gesture with the position of the popped-up object.

In addition, if a plurality of event notifications are simultaneously displayed, the controller 280 can control the event notifications to disappear in order of the uppermost layered event, as the first signal corresponding to the first touch gesture is received. In addition, in a displayed state of an event notification, if all subsequent event notifications including the corresponding event notification are not to be displayed, the mobile terminal 100 may be turned upside down such that a front surface of the touch screen 151 of the mobile terminal 100 may be positioned to face a floor. As a result, all push notifications may be immediately turned off.

Here, whether the front surface of the touch screen 151 of the mobile terminal 100 has been positioned to face the floor may be determined by the sensing unit 140 of the mobile terminal 100 (e.g., an illumination sensor). In an environment where an event notification is limitedly displayed, a user can have a more enhanced sense of immersion to content by immediately deleting a corresponding event notification, or by controlling all event notifications not to be displayed.

FIG. 11B illustrates an example to change the position of the event notification 1110 which disturbs a sense of immersion, while a game 1101 is being executed on the HMD 200. In a popped-state of the object indicating an event occurrence, upon reception of a second signal corresponding to a second touch gesture applied to the touch screen 151 of the mobile terminal 100 connected to the HMD 200 (e. g., a second signal corresponding to a flicking touch input 'B' that a touch point is upward moved, the touch point where a touch input more than a reference pressure has been applied), the controller 280 of the HMD 200 can move the popped-up object to a content position (1101b) corresponding to the second signal (1101b). For this, the second signal includes information on a flicking direction and a movement degree.

In an embodiment, once the position of the event notification is changed, subsequent event notifications may be also displayed on the changed position. That is, a display region indicating an event occurrence may be changed into a position corresponding to the second signal. Accordingly, as shown in FIG. 11B, if a next event occurs, the previous object is stacked on the edge region (1122) and an object 1101c corresponding to the next event 'd' is displayed on the changed position. Once a user enters an event notification mode, he or she may check at one time the event notification stacked on the edge region, and an event notification not stacked on the edge region even if it has not been checked.

Figure 12:
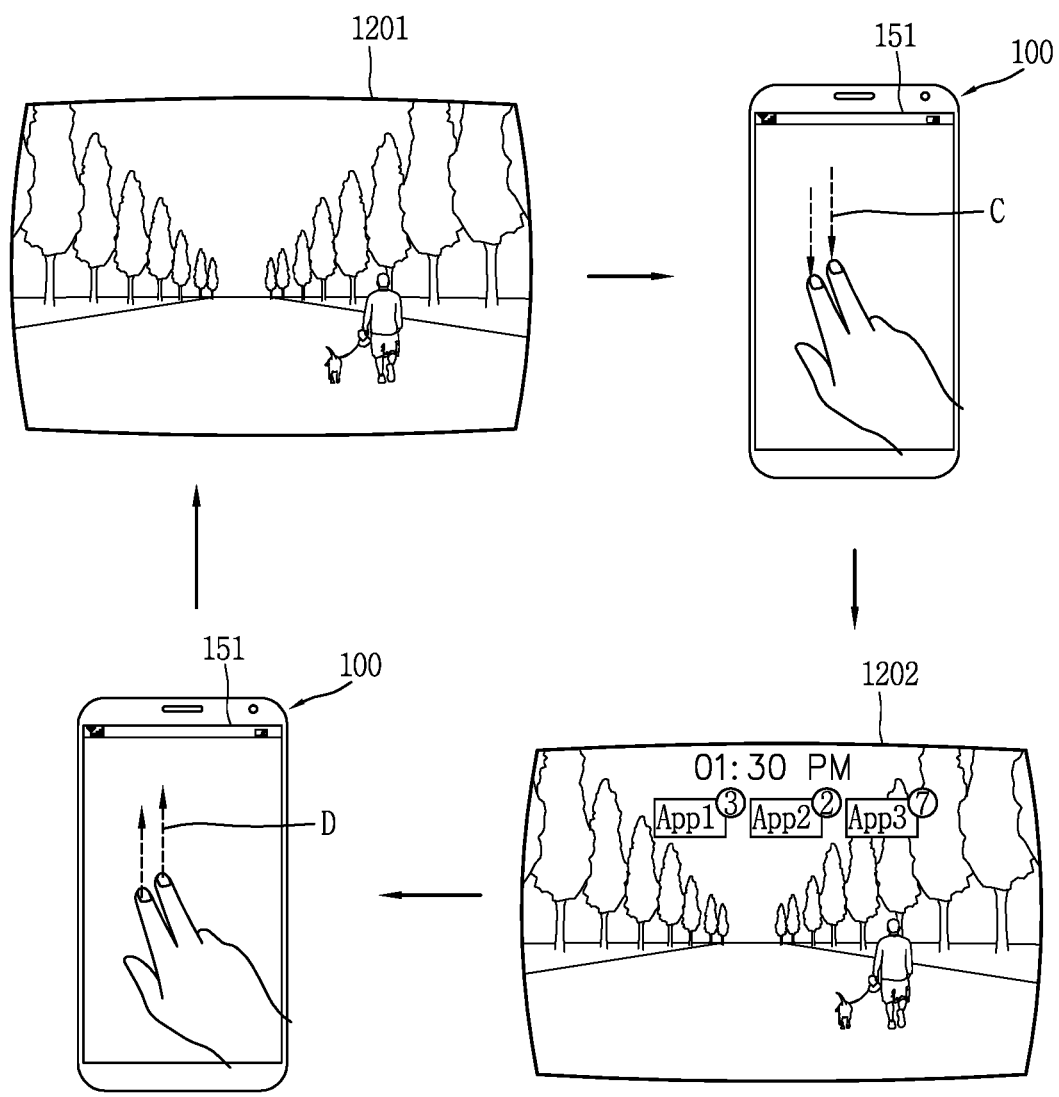
FIG. 12 is a view illustrating an example to enter an operation mode for checking an event selectively provided, using a touch input, in an HMD according to an embodiment of the present invention.

FIG. 12 is a view illustrating an example to rapidly enter an event notification mode in the HMD according to an embodiment of the present invention, using a touch input to the mobile terminal 100. Referring to FIG. 12, while a content is being displayed on the display unit 251 of the HMD 200, upon reception of a third signal corresponding to a drag input toward a preset direction (e.g., a downward drag) from a plurality of touch points on the touch screen 151 of the mobile terminal 100, the HMD 200 can enter an event notification mode.

In the event notification mode, an output state and an operation state of the content being displayed on the display unit 251 are maintained. Accordingly, a user can check an event notification with maintaining a sense of immersion, without stopping viewing the content. In the event notification mode, information about an event notification stacked on an edge region, and/or information an event notification not stacked on the edge region even if it has not been checked are displayed on the content in an overlapped manner, in a drag direction included in the third signal.

The information about the event notification may include information about one or more applications corresponding to one or more events, and information about the number of events. In the event notification mode, specific information received from the mobile terminal 100, e.g., information about a current time, a battery amount, etc. may be further displayed.

Referring to FIG. 12, in the event notification mode, upon reception of a fourth signal corresponding to a drag input toward an opposite direction to the preset direction (e.g., an upward drag) from a plurality of touch points on the touch screen 151 of the mobile terminal 100, the event notification mode is terminated.

Figure 13:
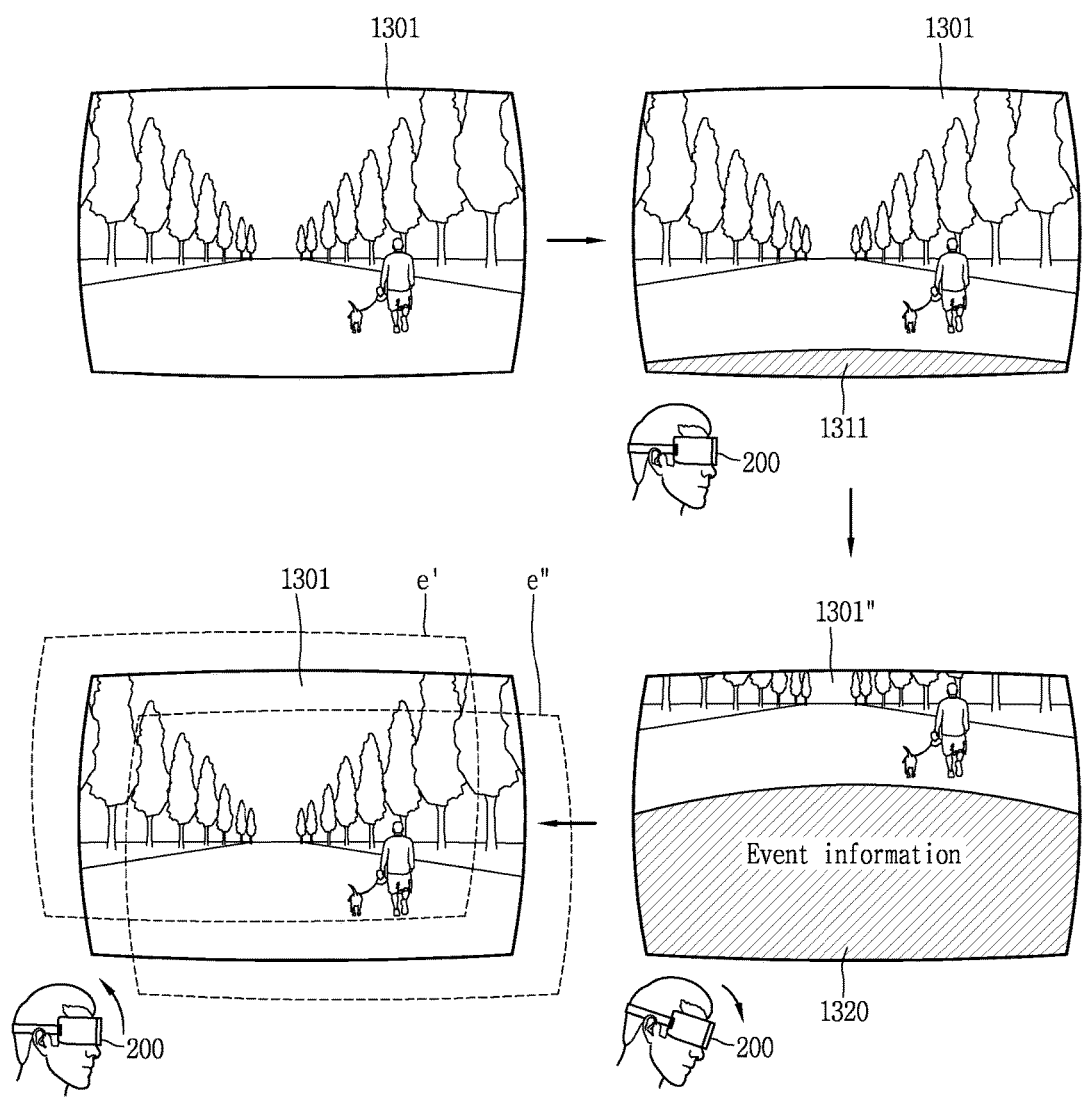
FIG. 13 is a view illustrating a method for gradually providing information of an event notification selectively provided, using an additional interaction, in an HMD according to an embodiment of the present invention.

FIG. 13 is a view illustrating a method for gradually providing an event notification, using an additional interaction, in the HMD according to an embodiment of the present invention. In FIG. 13, an object indicating an event occurrence is implemented as a graphic object or an image effect which does not provide information about a generated event.

That is, in the aforementioned embodiments, when an event occurs, an event notification is selectively popped-up based on a type of the event and a type of a content displayed on the display unit 251. However, in FIG. 13, information merely notifying an event occurrence may be provided through a glow effect or a spread effect provided on a lower end or an upper end of a content being displayed (1311), when the content is not blocked, for prevention of disturbance of a sense of immersion. With such a configuration, a user can view the content without a lowered sense of immersion, even if he or she does not know a type of a generated event.

In this state, if a head gesture towards a first direction is sensed, the displayed content is moved towards a second direction opposite to the first direction, such that an image which changes along the second direction is displayed on the object. A direction of the head gesture may be sensed by the sensing unit 240 of the HMD 200.

For instance, as shown in FIG. 13, if the HMD 200 is downward moved, an application range of the glow effect provided on the lower end of the content is gradually increased. As a result, displayed is a region 1320 where information related to the corresponding event (e.g., 'event information') has been displayed. When the region where event information has been displayed is displayed, the content is scrolled in the second direction. The execution state of the scrolled content may be temporarily stopped.

The controller 280 can control a display degree of the event information according to a movement degree of the head gesture. As a moving distance of the head gesture towards the first direction is increased, the region 1320 is extended, and the amount of the event information is also increased. For instance, when the HMD 200 is more downward moved, the amount of received messages is more increased. If the head gesture is continuously executed even if there is no information to be displayed, the display unit may be converted into an event-related execution screen.

The controller 280 can control the region 1320 or the object to be displayed as different images, according to the amount of event-related information. Here, the different images mean images different from each other in shape, length, color, etc. If the HMD 200 is moved towards the second direction (i.e., if the HMD 200 is upward moved) after event information is checked, the region 1320 where the event information has been displayed disappears gradually, and the content which has been upward scrolled is downward scrolled towards the first direction opposite to the second direction.

In a displayed state of the region 1320 where the event information has been displayed, if the HMD 200 is moved towards the second direction, the previous output region or screen is displayed on the display unit 251 regardless of a moving distance. That is, even if a head gesture is not precisely executed towards a direction opposite to the first direction, the controller 280 can display the previous region of the virtual space by remembering the previous region in a direction similar to the opposite direction. That is, referring to FIG. 13, even if region e' or region e" should be displayed according to a substantial moving direction of the HMD 200, the controller 280 controls the display unit 251 to return to the content screen 1301 by remembering the previous region. Once the previous region is displayed on the display unit 251, the changed execution state of the content is automatically restored to the original state.

Figure 14A:
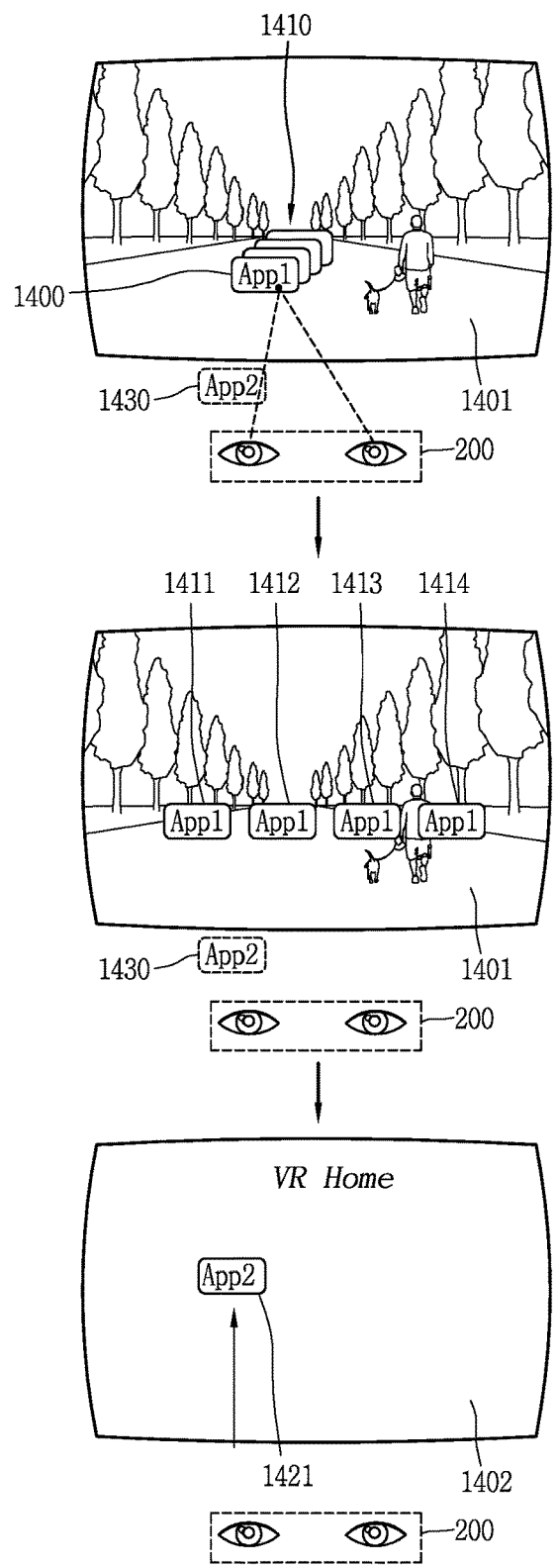
FIGS. 14A to 14C are views illustrating examples to display a plurality of event notifications selectively provided, in an HMD according to an embodiment of the present invention.
Figure 14B:
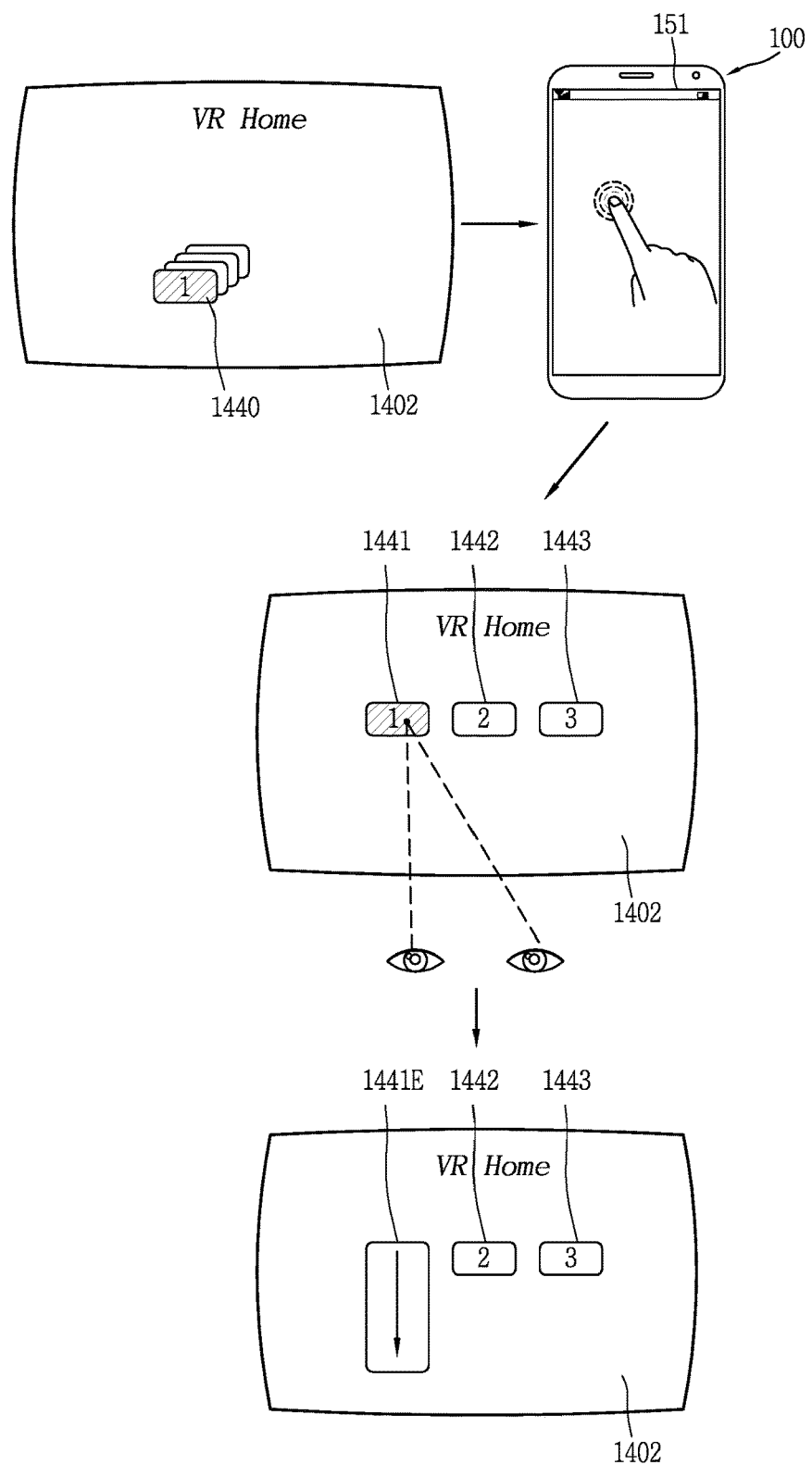
Figure 14C:
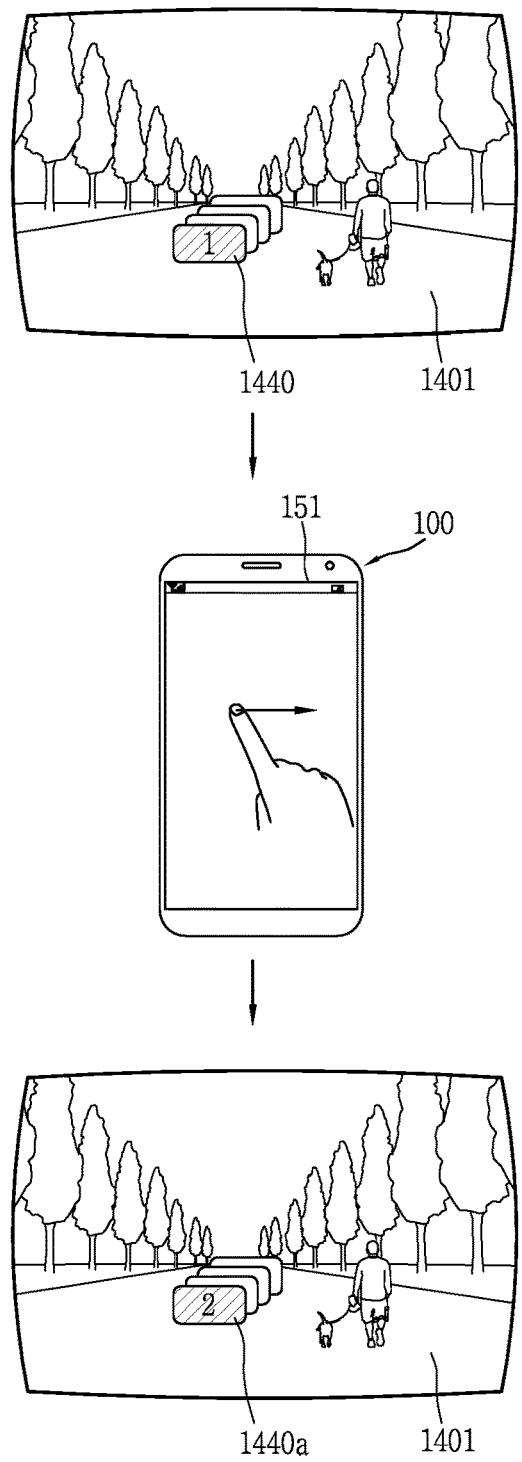

FIGS. 14A to 14C are views illustrating examples to display a plurality of event notifications and to check a specific event, in the HMD 200 according to an embodiment of the present invention. If a plurality of events occur simultaneously or at preset time intervals, an integrated object 1410 indicating an event occurrence may be generated on a displayed content 1401, as shown in FIG. 14A. The integrated object 1410 may be implemented as a plurality of event notification images are displayed in the form of a bundle.

If a user's eye line is fixed to the integrated object 1410 ('second input'), the controller 280 can convert the integrated object 1410 into a plurality of objects corresponding to a plurality of events. As a result, as shown in FIG. 14A, the integrated object 1410 is unfolded on the content after being transformed into a plurality of objects (1411, 1412, 1413, 1414), and the execution state of the content is temporarily stopped.

In the converted state of the integrated object into the plurality of objects, if the user's eye line is out of the objects (i.e., if the second input is released), the plurality of objects may be re-converted into the integrated object. And the stopped execution state of the content may be resumed.

In an embodiment, if a plurality of events occur from a first application sequentially, the controller 280 can firstly display only event notifications about the events generated from the first application, as an integrated object. For instance, referring to FIG. 14A, an event notification 1430 about an event generated from a second application is not displayed on the content, but is displayed on a home screen 1402 when the home screen 1402 is displayed as the display state of the content is terminated (1421)

In another embodiment, referring to FIG. 14B, if a touch input having more than a reference pressure is applied to the touch screen 151 of the mobile terminal 100, in a displayed state of an integrated object 1440 on the HMD 200, the integrated object 1440 is disassembled into a plurality of objects. In this instance, if intensity (a touch degree) of the touch input applied to the touch screen 151 is changed, the number of the objects may be changed or the plurality of objects may be re-converted into the integrated object 1440.

Referring to FIG. 14B, if a user's eye line is fixed to a specific object 1441 in the disassembled state of the integrated object 1440, information related to a corresponding event ('1') is unfolded (1441E). As another example, referring to FIG. 14C, when the integrated object 1440 has been displayed on the content 1401, if a signal corresponding to a third input applied to the touch screen 151 of the mobile terminal 100 (e.g., a drag input applied right and left) is received, the controller 280 can change a layered order of a plurality of events corresponding to the integrated object, based on the received signal. As a result, a representative image of the integrated object may be easily changed into event notification '2' from event notification '1'.

Figure 15A:
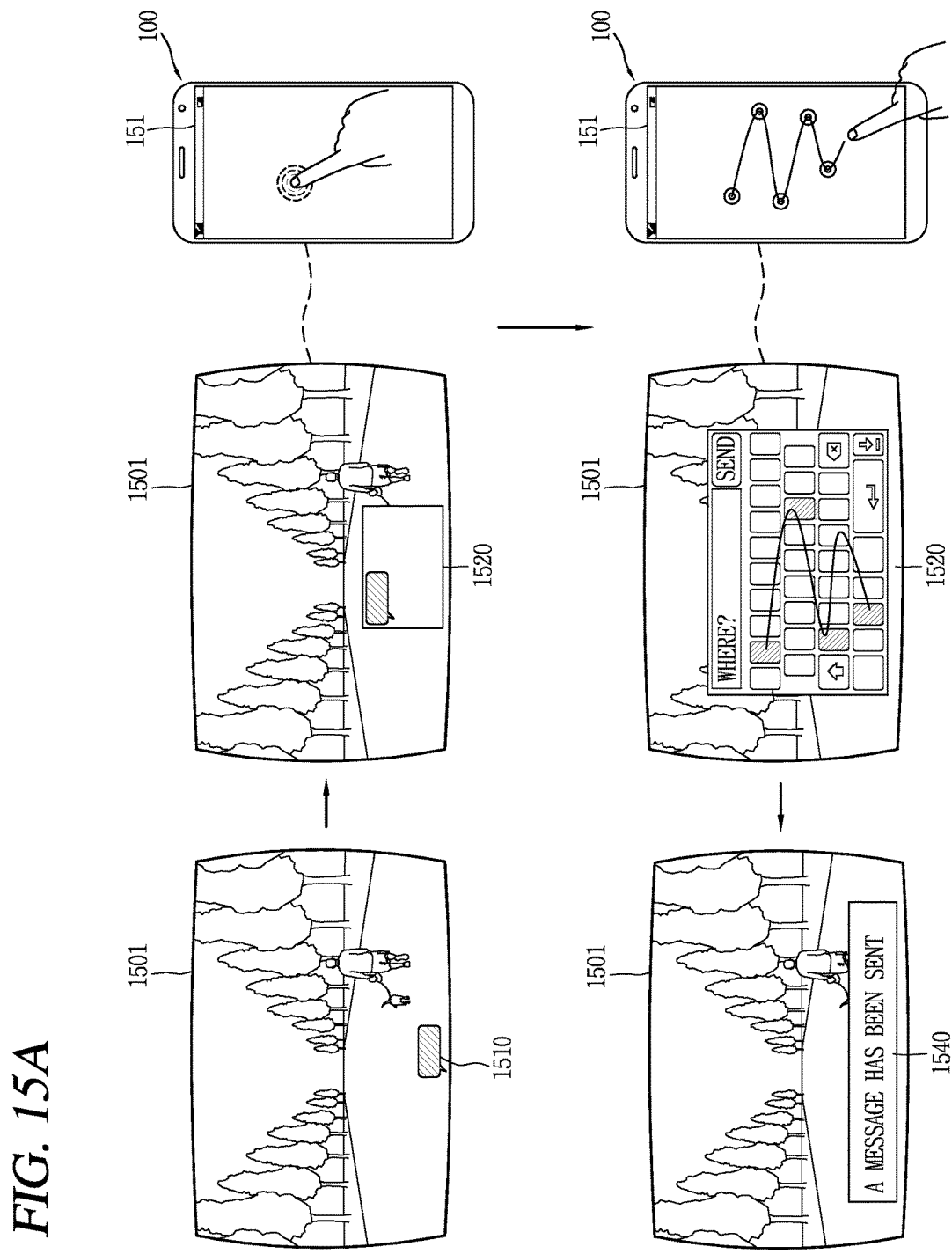
FIGS. 15A and 15B are views illustrating examples to make a response to an event selectively provided, in an HMD according to an embodiment of the present invention.
Figure 15B:
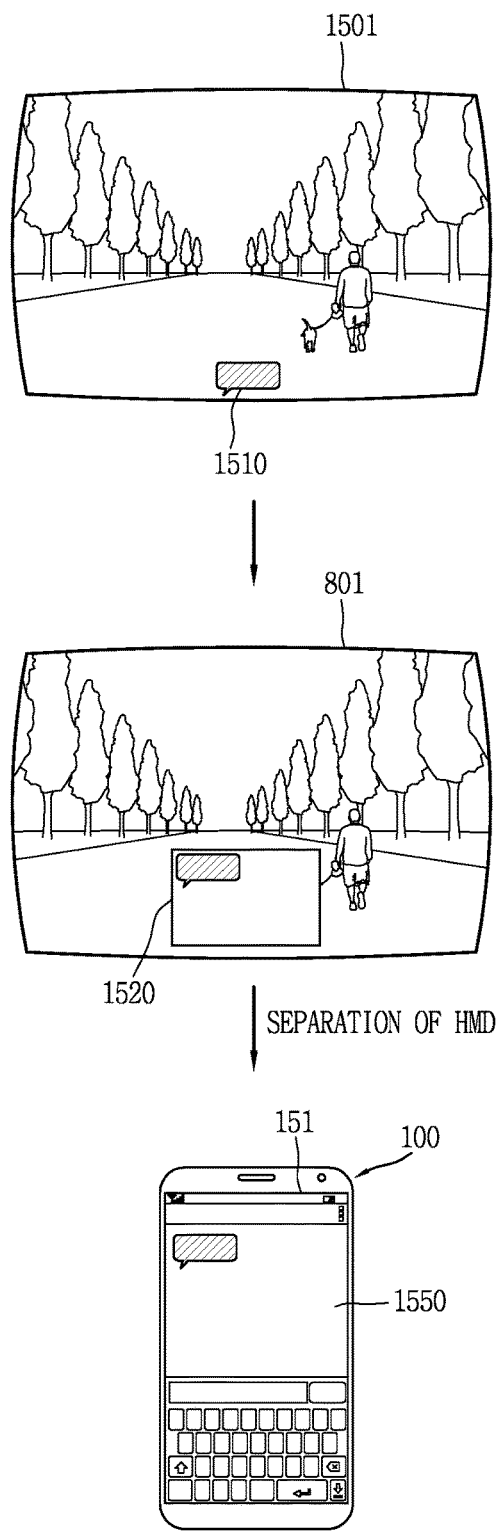

FIGS. 15A and 15B are views illustrating examples to make a response to an event in the HMD according to an embodiment of the present invention. FIG. 15A is a view illustrating an example to make a response to an event in a worn (mounted) state of the HMD 200, and FIG. 15B is a view illustrating an example to make a response to an event on the mobile terminal 100, in a separated (detached) state of the HMD 200.

As shown in FIG. 15A, when event-related information 1520 has been displayed on a displayed content 1501, if a touch input signal having more than a reference pressure is applied to the touch screen 151 of the mobile terminal 100 as a preset input signal, the controller 280 can temporarily stop the execution state of the displayed content 1501. And the controller 280 can control a virtual keypad 1520 for making a response to an event, to be popped-up on the content 1501.

Here, a message input using the virtual keypad 1520 may be executed on the touch screen 151 of the mobile terminal 100 connected to the HMD 200. For this, if a first touch input is applied to the touch screen 151 in a popped-up state of the virtual keypad 1520 on the HMD 200, a cursor or a pointer may be generated on the display unit 251 of the HMD 200. The generated cursor or pointer moves based on a change value of relative coordinates of the virtual keypad 1520 corresponding to a drag path of a drag touch input consecutively applied to the touch screen 151. Here, if the controller 280 of the HMD 200 operates independently from the controller 180 of the mobile terminal 100 connected to the HMD 200, the controller 280 of the HMD 200 can change a touch-related signal received from the mobile terminal 100 into cursor coordinates, and may move the cursor.

Selecting a specific alphabet on the virtual keypad 1520 using the cursor or the pointer may be executed by positioning the cursor or the pointer on a desired alphabet, and then by changing a touch degree of a touch input applied to the touch screen 151 (e.g., by increasing the intensity of the touch input) or through a signal corresponding to an eye blinking. Once a message writing and a message sending are completed by using the cursor or the pointer, a notification icon 1540 indicating the message sending appears on the content. Then, the notification icon 1540 disappears, and the content of which execution has been stopped is re-executed.

In another embodiment, a push input may be applied to a specific key to activate a voice recognition function of the mobile terminal 100. Then, a response may be made through a voice command. In another embodiment, if a rapid response to an event (e.g., writing) than a content viewing is required, the HMD 200 can be detached from a user's head in a displayed state of event-related information or an input pad, and a response may be made on the mobile terminal 100.

Here, even if the touch screen 151 of the mobile terminal 100 is in a deactivated state or another execution screen is being output, if the HMD 200 is detached from the user's head while a specific input signal is being applied in a displayed state of event-related information on the display unit 251 of the HMD 200, a control command to execute an application corresponding to a corresponding event may be generated. Then, the generated control command may be transmitted to the mobile terminal 100.

After completing a response process through the mobile terminal 100, if the HMD 200 is re-worn (re-mounted) on the user's head within a predetermined time, a region which was being output when the HMD 200 was detached is re-displayed on the display unit 251. This allows the user to view the corresponding content with a sense of immersion.

In the specification, the operations are executed by the controller 280 of the HMD 200. However, the present invention is not limited to this. That is, the same operations may be executed by the controller 180 of the mobile terminal 100 connected to the HMD 200 by wire or wirelessly.

As aforementioned, in the HMD device and the method for controlling the same according to an embodiment of the present invention, while a user views a content, an event notification is selectively provided based on a type of the content and a type of an event. This may enhance user's sense of immersion. Further, even if the event notification is selectively provided, the event notification is moved along a head gesture without disappearing, only when the user is interested in the event notification. This may maximize the user's sense of immersion to the content, and allows the user not to miss an important event notification.

The configurations and methods of the mobile terminal in the aforesaid embodiments may not be limitedly applied, but such embodiments may be configured by a selective combination of all or part of the embodiments so as to implement many variations.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A head mounted display (HMD) device, comprising:
a display configured to display a content received from a mobile terminal; and
a controller configured to:
in response to an event generated on the mobile terminal, selectively display an object on the display corresponding to the event generated on the mobile terminal, based on a type of the displayed content,
wherein the controller is further configured to restrict displaying of the object while the content is being displayed when the event generated on the mobile terminal corresponds to an application related to the content displayed on the display of the HMD device.

2. The HMD device of claim 1, wherein the controller is further configured to change an image of the object based on an execution degree of the content displayed on the display of the HMD device.

3. The HMD device of claim 2, wherein the execution degree of the content includes at least one of an execution time of the content, an execution frequency of the content, an execution state of the content, and an entry degree into a lower content from the content displayed on the display of the HMD device.

4. The HMD device of claim 1, wherein the controller is further configured to display the object on the display corresponding to the event generated on the mobile terminal when the event is generated from a preset application and satisfies a specific condition preset by a user input.

5. The HMD device of claim 1, wherein in response to a preset input to the displayed object being received, the controller is further configured to move the object on the display along with a movement of the HMD device, while the displayed content is also moved to correspond to the movement of the HMD device.

6. The HMD device of claim 1, wherein in response to a movement of the HMD device being sensed, the controller is further configured to move the object on the display to correspond to the movement of the HMD device together with the displayed content, and stop displaying the object when a predetermined time lapses.

7. The HMD device of claim 1, wherein the controller is further configured to:
in response to a user's eye line being fixed to the object for a predetermined time, change an image of the object and display information related to the event on the changed image.

8. The HMD device of claim 1, wherein the controller is further configured to move the object to an edge region of the display in response to a first touch input applied to a touch screen of the mobile terminal.

9. The HMD device of claim 8, wherein the edge region is divided into a plurality of regions according to an application type, and
wherein the controller is further configured to move the object to a corresponding edge region according to an application of the event corresponding to the object.

10. The HMD device of claim 8, wherein when the object is moved to the corresponding edge region, the controller is further configured to change the object into a preset image.

11. The HMD device of claim 8, wherein the controller is further configured to display information about the event corresponding to the object on the content, in response to a user's eye line being fixed to the edge region for a predetermined time.

12. The HMD device of claim 8, wherein in response to a plurality of touch points on the touch screen of the mobile terminal being dragged to a preset direction while the content is being displayed, the controller is further configured to enter an operation mode for checking events corresponding to objects which have moved to the edge region.

13. The HMD device of claim 12, wherein the controller is further configured to:
display the events corresponding to the objects which have moved to the edge region, on the content in an integrated manner, and
display information about an event occurrence time on each of the objects.

14. The HMD device of claim 1, wherein in response to a preset touch gesture applied to a touch screen of the mobile terminal, the controller is further configured to stop displaying the object on the display of the HMD device.

15. The HMD device of claim 1, wherein the controller is further configured to change a position of the object along a touch path of a touch gesture applied to a touch screen of the mobile terminal.

16. The HMD device of claim 1, wherein in response to the HMD device being moved in a first direction while the object is displayed, the controller is further configured to move the displayed content in a second direction opposite to the first direction, and
display information related to the event on the image of the object.

17. The HMD device of claim 16, wherein the controller is further configured to control a display degree of the information related to the event, based on a moving distance of the HMD device in the first direction.

18. A method of controlling a head mounted display (HMD) device, the method comprising:
displaying, via a display of the HMD device, a content received from a mobile terminal communicating with the HMD device;
in response to an event generated on the mobile terminal, selectively displaying, via a display of the HMD device, an object corresponding to the event generated on the mobile terminal, based on a type of the displayed content; and restricting displaying of the object while the content is being displayed when the event generated on the mobile terminal corresponds to an application related to the content displayed on the display of the HMD device.

19. The HMD device of claim 1, wherein the restriction of displaying the object is released and the object is displayed on the display of the HMD device when a preset condition is satisfied.

* * * * *